(12) United States Patent
Tanaka

(10) Patent No.: US 9,512,788 B2
(45) Date of Patent: Dec. 6, 2016

(54) APPARATUS FOR DETECTING ABNORMAL COMBUSTION IN A COMBUSTION ENGINE

(71) Applicant: Hiroyuki Tanaka, Suntou-gun (JP)

(72) Inventor: Hiroyuki Tanaka, Suntou-gun (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 122 days.

(21) Appl. No.: 14/421,306

(22) PCT Filed: Nov. 13, 2013

(86) PCT No.: PCT/IB2013/002513
§ 371 (c)(1),
(2) Date: Feb. 12, 2015

(87) PCT Pub. No.: WO2014/076536
PCT Pub. Date: May 22, 2014

(65) Prior Publication Data
US 2015/0233309 A1    Aug. 20, 2015

(30) Foreign Application Priority Data
Nov. 16, 2012   (JP) ................................ 2012-252420

(51) Int. Cl.
G06G 7/70 (2006.01)
F02D 15/04 (2006.01)
F02B 5/02 (2006.01)
F02D 41/14 (2006.01)
F02D 41/00 (2006.01)

(52) U.S. Cl.
CPC ................. F02D 15/04 (2013.01); F02B 5/02 (2013.01); F02D 41/0097 (2013.01); F02D 41/1498 (2013.01)

(58) Field of Classification Search
CPC .. F02D 15/04; F02D 41/1498; F02D 41/0097; F02B 5/02
(Continued)

(56) References Cited

U.S. PATENT DOCUMENTS

2006/0086177 A1* 4/2006 Okubo .................. G01L 23/225
                                                                    73/35.12
2006/0243030 A1    11/2006 Oe et al.
(Continued)

FOREIGN PATENT DOCUMENTS

EP          1801400 A1    6/2007
GB          2471893 A     1/2011
(Continued)

Primary Examiner — Marguerite McMahon
(74) Attorney, Agent, or Firm — Andrews Kurth Kenyon LLP

(57) ABSTRACT

A spark ignition internal combustion engine includes: a compression ratio changing mechanism by which a volume of a combustion chamber varies; a cylinder internal pressure sensor that acquires a pressure signal of a pressure vibration inside a cylinder; and an abnormal combustion detector including a filter that passes the pressure signal, of a set frequency band among the pressure signal, and detecting an occurrence of abnormal combustion based on the pressure signal having passed through the filter. The abnormal combustion detector sets a frequency band of the filter based on a crank angle section in which abnormal combustion occurs and on a mechanical compression ratio.

7 Claims, 16 Drawing Sheets

(58) Field of Classification Search
USPC .......................... 123/48 R–48 D, 78 R–78 E
See application file for complete search history.

(56) References Cited

U.S. PATENT DOCUMENTS

| | | | | |
|---|---|---|---|---|
| 2007/0271025 | A1* | 11/2007 | Yasui | F02D 41/1406 |
| | | | | 701/102 |
| 2008/0294323 | A1 | 11/2008 | Shinozaki et al. | |
| 2010/0132674 | A1 | 6/2010 | Akihisa et al. | |
| 2011/0191007 | A1* | 8/2011 | Glugla | F02D 41/0085 |
| | | | | 701/103 |
| 2012/0245827 | A1* | 9/2012 | Glugla | F02D 41/402 |
| | | | | 701/105 |
| 2013/0024089 | A1* | 1/2013 | Wang | F02D 41/1462 |
| | | | | 701/102 |
| 2013/0035841 | A1* | 2/2013 | Glugla | F02D 41/22 |
| | | | | 701/102 |
| 2013/0213354 | A1* | 8/2013 | Urano | F02D 41/0002 |
| | | | | 123/435 |
| 2014/0048038 | A1* | 2/2014 | Yasuda | F02D 35/023 |
| | | | | 123/395 |

FOREIGN PATENT DOCUMENTS

| | | |
|---|---|---|
| JP | 2006-307707 A | 11/2006 |
| JP | 2007-092610 A | 4/2007 |
| JP | 2007-231903 A | 9/2007 |
| JP | 2008-025510 A | 2/2008 |
| JP | 2008-157087 A | 7/2008 |
| KR | 10-2010-0005709 A | 1/2010 |

* cited by examiner

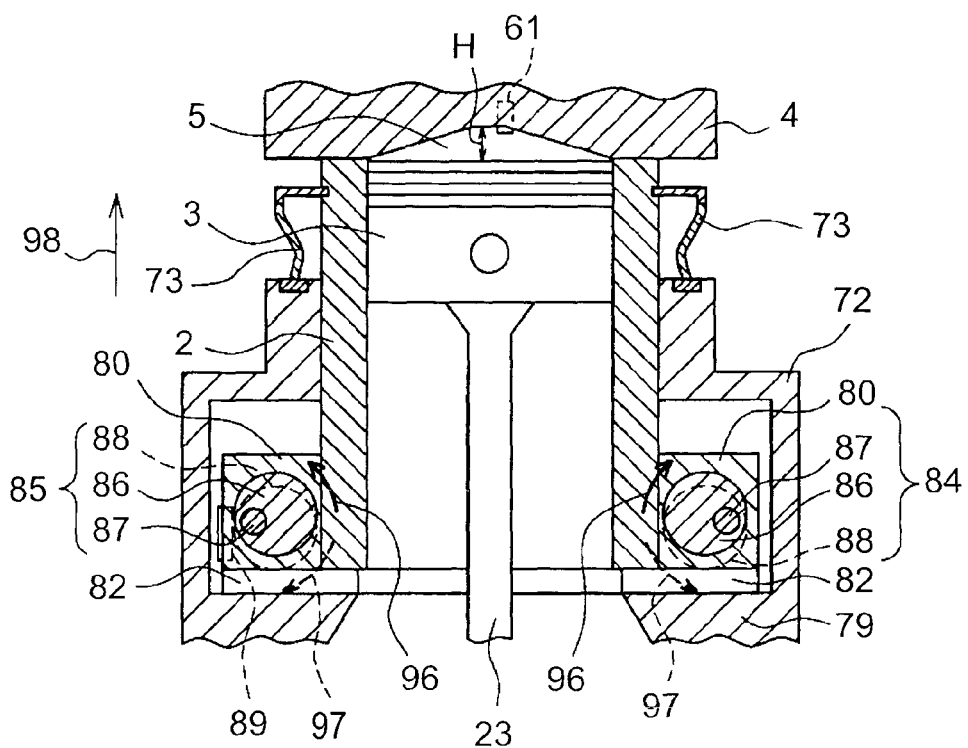
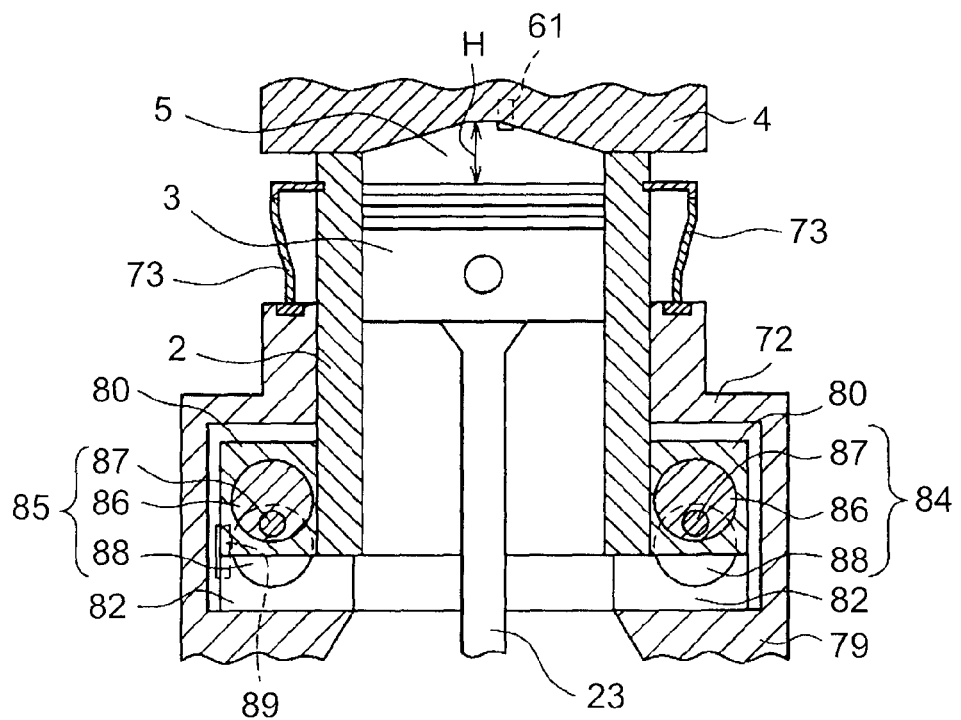

(LOW ROTATIONAL SPEED)

TIME t0              TIME t1

(HIGH ROTATIONAL SPEED)

TIME t0              TIME t1

APPARATUS FOR DETECTING ABNORMAL COMBUSTION IN A COMBUSTION ENGINE

CROSS-REFERENCE TO RELATED APPLICATIONS

This is a national phase application based on the PCT International Patent Application No. PCT/IB2013/002513 filed Nov. 13, 2013, claiming priority to Japanese Patent Application No. 2012-252420 filed Nov. 16, 2012, the entire contents of both of which are incorporated herein by reference.

FIELD OF THE INVENTION

This invention relates to a spark ignition internal combustion engine.

DESCRIPTION OF RELATED ART

In a combustion chamber of an internal combustion engine, combustion occurs in a state where an air-fuel mixture of air and fuel is compressed. A compression ratio when compressing an air-fuel mixture affects output torque of the internal combustion engine and fuel consumption. By increasing the compression ratio, output torque can be increased and fuel consumption can be reduced. On the other hand, an excessively high compression ratio causes abnormal combustion such as knocking. Internal combustion engines according to related art can change compression ratio during the internal combustion being operating.

Japanese Patent Application Publication No. 2007-92610 (JP 2007-92610 A) discloses an internal combustion engine including a variable compression ratio mechanism, a knock sensor, and an electronic control unit (ECU). The knock sensor is attached to a side surface of a cylinder block. The ECU detects that knocking has occurred in a cylinder of the internal combustion engine based on an output value of the knock sensor. When an occurrence of knocking is detected, this internal combustion engine prohibits control for changing an ignition timing in at least a part of a period during a compression ratio change operation. In addition, when an output of the knock sensor is captured by the ECU, a specific range of frequencies of an output signal may be selectively captured.

Japanese Patent Application Publication No. 2006-307707 (JP 2006-307707 A) discloses a knocking determining apparatus of an internal combustion engine. The knocking determining apparatus detects a vibration corresponding to a radial mode, and by comparing a waveform of the detected vibration with a knock waveform determined in advance, determines whether or not knocking has occurred. The radial mode is a resonance mode of pressure propagation of combustion in a cylinder. In addition, a cylinder internal pressure sensor is provided in a central upper part of the cylinder in order to detect a vibration corresponding to a resonance mode of the radial mode.

Japanese Patent Application Publication No. 2008-157087 (JP 2008-157087 A) discloses a knocking detecting apparatus including a cylinder internal pressure detector, an eliminator, an extractor, and a determinator. The cylinder internal pressure detector outputs a signal indicating cylinder internal pressure of an engine. The eliminator eliminates a cylinder internal pressure component during a knocking detection from an output signal of the cylinder internal pressure detector. The extractor extracts a signal having a frequency within a prescribed frequency band including a frequency of knocking from the signal from which the cylinder internal pressure component has been eliminated. The determinator determines an occurrence of knocking from the extracted signal.

Japanese Patent Application Publication No. 2007-231903 (JP 2007-231903 A) discloses a knocking determining apparatus of an internal combustion engine. The knocking determining apparatus processes a detection signal from a sensor that detects internal pressure of a cylinder to determine knocking. This knocking determining apparatus determines knocking by calculating a knocking intensity in one combustion cycle based on the detection signal from the sensor and comparing the knocking intensity with a reference intensity related to an allowable limit of temperature rise of a piston.

Japanese Patent Application Publication No. 2008-25510 (JP 2008-25510 A) discloses a controller of an internal combustion engine including a knocking detector, a cylinder internal pressure detector, a crank angle detector, and a knocking determinator. The knocking detector detects a vibration of a knock frequency. The cylinder internal pressure detector detects a cylinder internal pressure maximum value in a cycle in which the vibration of a knock frequency has been detected. The crank angle detector detects a crank angle at which the vibration of the knock frequency has been detected. Based on a combination of the cylinder internal pressure maximum value and the crank angle, the knocking determinator determines that the vibration detected by the knocking detector is attributable to knocking.

Abnormal combustion such as knocking occurs when combustion that differs from propagation of desired combustion occurs. The occurrence of abnormal combustion causes gas inside a cylinder to vibrate and creates a pressure wave having a prescribed frequency. As a result, an engine body including a cylinder block vibrates. The vibration of the engine body created in this manner is detected by a knock sensor attached to the engine body, thereby enabling an occurrence of an abnormal combustion to be detected.

With the internal combustion engine disclosed in JP 2007-92610 A, the knock sensor is arranged on the side surface of the cylinder block. Pressure vibration of gas inside the cylinder is detected via the cylinder block. The detected vibration of the cylinder block is affected by a natural frequency of the engine body. In consideration thereof, JP 2007-92610 A describes that a frequency of a selectively captured signal is varied in accordance with the natural frequency of the engine body. The natural frequency of the engine body varies depending on a structure of the internal combustion engine. In particular, when changing a compression ratio, a frequency that is selectively captured in accordance with the compression ratio is changed.

However, JP 2007-92610 A does not specifically disclose how the frequency that is selectively captured in accordance with the compression ratio is determined. In addition, generally, it is difficult to predict a frequency of a vibration when knocking occurs. Therefore, a vibration can be extracted in a frequency band having a constant frequency width. However, even if a position of a frequency band in accordance with a compression ratio is simply changed, noise in a detected signal increases or knocking can not be correctly detected.

SUMMARY OF THE INVENTION

This invention provides a spark ignition internal combustion engine capable of accurately detecting an occurrence of abnormal combustion.

A spark ignition internal combustion engine according to a first aspect of the invention includes: a compression ratio changing mechanism configured to change a mechanical compression ratio; a cylinder internal pressure acquiring unit that acquires a pressure signal indicating a pressure vibration inside a cylinder; a filter that passes the pressure signal having a frequency within a set frequency band among the pressure signal acquired by the cylinder internal pressure acquirer; and an abnormal combustion detector that detects an occurrence of abnormal combustion based on the pressure signal having passed through the filter. The abnormal combustion detector is formed so as to set a frequency band of the filter based on a crank angle section in which abnormal combustion occurs and on the mechanical compression ratio. When changing the frequency band of the filter in accordance with a variation of the mechanical compression ratio, the abnormal combustion detector changes a frequency width of the frequency band.

With the spark ignition internal combustion engine according to the first aspect of the invention, the compression ratio changing mechanism may changes the mechanical compression ratio by changing a volume of a combustion chamber when a piston reaches top dead center.

With the spark ignition internal combustion engine according to the first aspect of the invention, the compression ratio changing mechanism may change the mechanical compression ratio by changing a height of a combustion chamber when a piston reaches top dead center, the pressure signal acquired by the cylinder internal pressure acquiring unit may include a pressure signal having a frequency that resonates in a height direction of the combustion chamber, and the abnormal combustion detector may set the frequency band of the filter through which the pressure signal having the frequency that resonates in the height direction of the combustion chamber passes.

The spark ignition internal combustion engine according to the first aspect of the invention may include a rotational speed detector that detects an engine rotational speed, wherein the abnormal combustion detector may set the frequency band of the filter such that the frequency of the filter becomes lower as the engine rotational speed increases.

The spark ignition internal combustion engine according to the first aspect of the invention may include an ignition timing detector that detects an ignition timing in the combustion chamber, wherein the abnormal combustion detector may set the frequency band of the filter based on the crank angle section, in which the abnormal combustion occurs, after the ignition timing.

The spark ignition internal combustion engine according to the first aspect of the invention may include an estimator that estimates a crank angle at which the abnormal combustion occurs based on the pressure signal acquired by the cylinder internal pressure acquirer, and a storage that stores a crank angle at which the abnormal combustion occurs and the mechanical compression ratio, wherein the abnormal combustion detector may set the frequency band of the filter based on the crank angle at which the abnormal combustion occurs and the mechanical compression ratio that are stored in the storage.

According to the first aspect of the invention, a spark ignition internal combustion engine capable of accurately detecting an occurrence of abnormal combustion can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a schematic sectional diagram of a portion of a cylinder block and a crank case when a mechanical compression ratio is a high compression ratio in the internal combustion engine according to the first embodiment;

FIG. 3 is a schematic sectional diagram of a portion of a cylinder block and a crank case when a mechanical compression ratio is a low compression ratio in the internal combustion engine according to the first embodiment;

DETAILED DESCRIPTION OF EMBODIMENTS

An internal combustion engine according to a first embodiment of the invention will be described with reference to FIGS. 1 to 9. In the present embodiment, a spark ignition internal combustion engine arranged in a vehicle will be described as an example.

Figure 1:
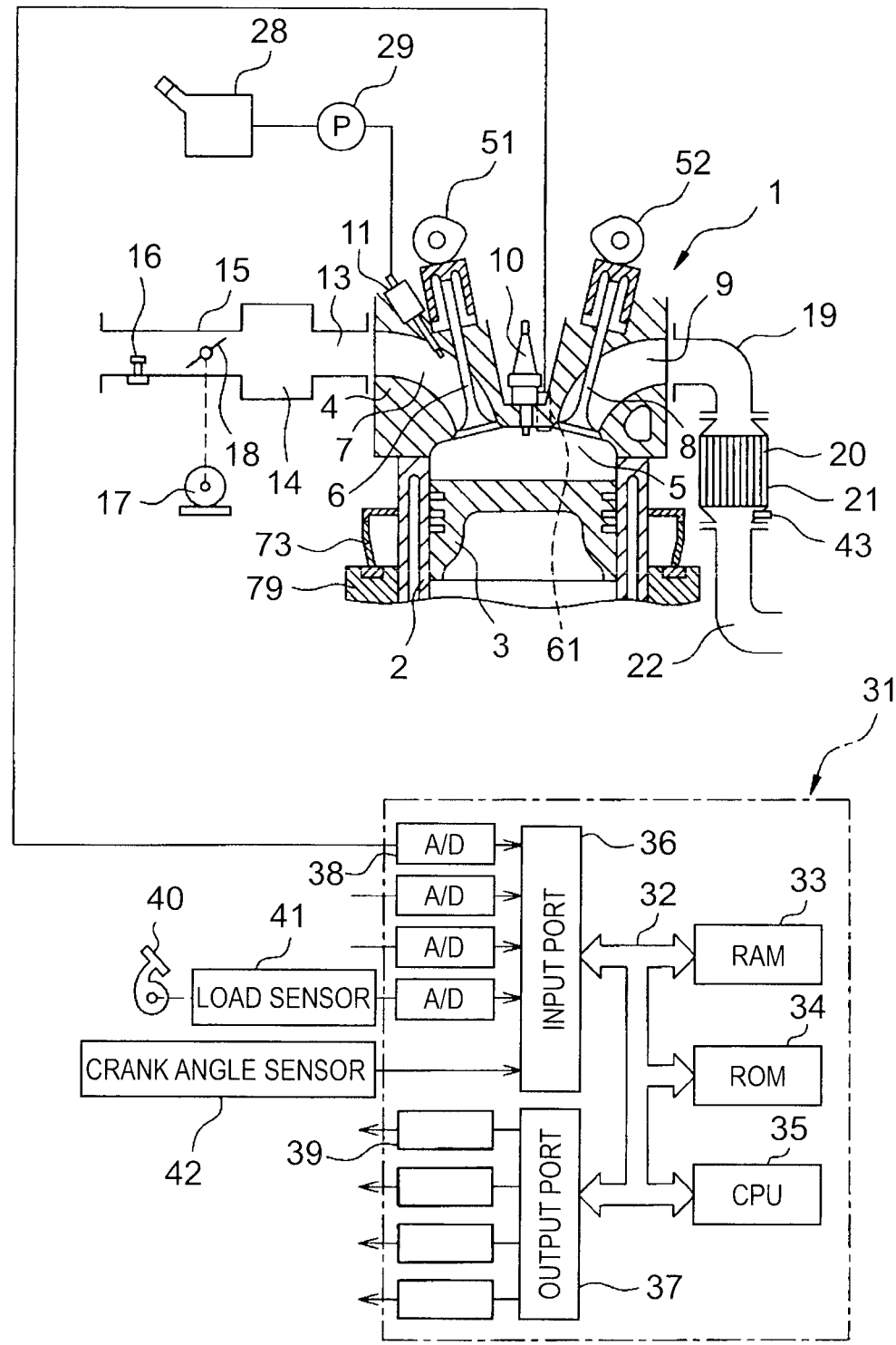
FIG. 1 is a schematic sectional diagram of an internal combustion engine according to a first embodiment.

FIG. 1 is a schematic diagram of an internal combustion engine according to the present embodiment. The internal combustion engine includes an engine body 1. The engine body 1 includes a cylinder block 2 and a cylinder head 4. A piston 3 is arranged inside the cylinder block 2. The piston 3 moves reciprocatively inside the cylinder block 2. A combustion chamber 5 is formed for each cylinder.

An intake port 7 and an exhaust port 9 are formed on the cylinder head 4. An intake valve 6 is arranged at an end of the intake port 7 and is formed to be capable of opening and closing an engine intake passage that communicates with the combustion chamber 5. An exhaust valve 8 is arranged at an end of the exhaust port 9 and is formed to be capable of opening and closing an engine exhaust passage that communicates with the combustion chamber 5. A spark plug 10 as an ignition device is fixed to the cylinder head 4. The spark plug 10 ignites fuel in the combustion chamber 5.

The internal combustion engine according to the present embodiment includes a cylinder internal pressure sensor 61 for detecting internal pressure of a cylinder. The cylinder internal pressure sensor 61 functions as a cylinder internal pressure acquirer that acquires a pressure vibration inside a cylinder. The cylinder internal pressure sensor 61 is fixed to the cylinder head 4. The cylinder internal pressure sensor 61 is arranged on a top surface of the combustion chamber 5 that intersects with a direction in which the piston 3 moves. In addition, the cylinder internal pressure sensor 61 is arranged in a vicinity of the spark plug 10. In other words, the cylinder internal pressure sensor 61 is arranged in a central part of the top surface of the combustion chamber 5.

The internal combustion engine according to the present embodiment includes a fuel injection valve 11 for supplying fuel to the combustion chamber 5. The fuel injection valve 11 is connected to a fuel tank 28 via an electronically controlled fuel pump 29 that is capable of changing discharge amounts. Fuel stored in the fuel tank 28 is supplied to the fuel injection valve 11 by the fuel pump 29.

The intake port 7 of each cylinder is coupled to a surge tank 14 via a corresponding intake branch pipe 13. The surge tank 14 is coupled to an air cleaner (not shown) via an intake duct 15. An air flow meter 16 that detects an intake air amount is arranged inside the intake duct 15. A throttle valve 18 that is driven by a step motor 17 is arranged inside the intake duct 15. Meanwhile, the exhaust port 9 of each cylinder is coupled to a corresponding exhaust branch pipe 19. The exhaust branch pipe 19 is coupled to an exhaust gas treatment apparatus 21. The exhaust gas treatment apparatus 21 according to the present embodiment includes a three-way catalyst 20. The exhaust gas treatment apparatus 21 is connected to an exhaust pipe 22.

The internal combustion engine according to the present embodiment includes an electronic control unit 31. The electronic control unit 31 according to the present embodiment includes a digital computer. The electronic control unit 31 includes a random access memory (RAM) 33, a read only memory (ROM) 34, a microprocessor (CPU) 35, an input port 36, and an output port 37. The RAM 33, the ROM 34, the CPU 35, the input port 36, and the output port 37 are connected to one another via a bidirectional bus 32.

An output signal of the air flow meter 16 is inputted to the input port 36 via a corresponding analog-to-digital (A/D) converter 38. A load sensor 41 is connected to an accelerator pedal 40. The load sensor 41 generates an output voltage in accordance with a depression amount of the accelerator pedal 40. The output voltage is inputted to the input port 36 via a corresponding A/D converter 38. A cylinder internal pressure sensor 61 generates an output signal in accordance with pressure in the combustion chamber 5. An output signal of the cylinder internal pressure sensor 61 is inputted to the input port 36 via a corresponding A/D converter 38.

A crank angle sensor 42 generates, for example, an output pulse each time a crankshaft rotates by a prescribed angle. The output pulse is inputted to the input port 36. An engine rotational speed can be detected from the output of the crank angle sensor 42. In addition, a crank angle can be detected from the output of the crank angle sensor 42. In the engine exhaust passage, a temperature sensor 43 as a temperature detector that detects a temperature of the exhaust gas treatment apparatus 21 is arranged downstream of the exhaust gas treatment apparatus 21. An output signal of the temperature sensor 43 is inputted to the input port 36 via a corresponding A/D converter 38.

Each output port 37 of the electronic control unit 31 is connected to the fuel injection valve 11 and the spark plug 10 via a corresponding drive circuit 39. The electronic control unit 31 according to the present embodiment is formed to perform fuel injection control and ignition control. Furthermore, an ignition timing of the spark plug 10 is controlled by the electronic control unit 31. In addition, the output port 37 is connected to the step motor 17 and the fuel pump 29 via a corresponding drive circuit 39. The step motor 17 drives the throttle valve 18. The step motor 17 and the fuel pump 29 are controlled by the electronic control unit 31. The intake valve 6 is opened and closed as an intake cam 51 rotates. The exhaust cam 8 is opened and closed as an exhaust cam 52 rotates.

The internal combustion engine according to the present embodiment includes a compression ratio changing mechanism. In the invention, a space in a cylinder enclosed by a crown surface of the piston and the cylinder head at an arbitrary position of the piston is referred to as a combustion chamber. A compression ratio of an internal combustion engine is determined depending on a volume of the combustion chamber when the piston reaches top dead center or the like. The compression ratio changing mechanism according to the present embodiment changes the compression ratio by changing the volume of the combustion chamber when the piston reaches top dead center.

FIG. 2 shows a first schematic sectional diagram of the compression ratio changing mechanism of the internal combustion engine according to the present embodiment. FIG. 2 is a schematic diagram when a high compression ratio is set by the compression ratio changing mechanism. FIG. 3 shows a second schematic sectional diagram of the compression ratio changing mechanism of the internal combustion engine according to the present embodiment. FIG. 3 is a schematic diagram when a low compression ratio is set by the compression ratio changing mechanism. FIGS. 2 and 3 show a state where the piston 3 has reached top dead center.

Referring to FIGS. 1 to 3, in the internal combustion engine according to the present embodiment, a supporting structure and the cylinder block 2 move relative to each other. The supporting structure includes a crank case 79. The cylinder block 2 is arranged on an upper side of the supporting structure. The supporting structure according to the present embodiment supports the cylinder block 2 via the compression ratio changing mechanism. In addition, the supporting structure according to the present embodiment supports the crankshaft to be rotatable by one rotational axis. The piston 3 is supported by the crankshaft via a connecting rod 23.

A plurality of protrusions 80 are formed below side walls on both sides of the cylinder block 2. A cam insertion hole with a circular cross section is formed on the protrusions 80. A circular cam 86 is rotatably arranged inside the cam insertion hole. A plurality of protrusions 82 are formed on the crank case 79. A cam insertion hole with a circular cross section is formed on the protrusions 82. A circular cam 88 is rotatably arranged inside the cam insertion hole. The protrusions 80 of the cylinder block 2 fit between protrusions 82 of the crank case 79.

The circular cam 86 and the circular cam 88 are coupled to each other via an eccentric shaft 87. The circular cam 86 is inserted into the protrusion 80 of the cylinder block 2. The circular cam 88 is inserted into the protrusion 82 of the crank case 79. Camshafts 84 and 85 are constituted by the plurality of circular cams 86 and the plurality of circular cams 88 being coupled to one another via the eccentric shaft 87. In the present embodiment, a pair of camshafts 84 and 85 is formed. The compression ratio changing mechanism according to the present embodiment includes a rotating device that rotates each of the pair of camshafts 84 and 85 in opposite directions. The circular cam 88 is coaxially arranged with a rotational axis of the camshafts 84 and 85. The circular cam 86 is eccentric with respect to the rotational axis of the camshafts 84 and 85. In addition, the eccentric shaft 87 is eccentric with respect to the rotational axis of the camshafts 84 and 85.

Referring to FIG. 2, when the circular cams 88 are respectively rotated in opposite directions as indicated by an arrow 97, the eccentric shaft 87 moves toward an upper end of the circular cam 88. The respective circular cams 88 are arranged on the camshafts 84 and 85. The circular cam 86 supporting the cylinder block 2 rotates inside the cam insertion hole in an opposite direction to the circular cam 88 as indicated by an arrow 96. The cylinder block 2 moves so as to separate from the crank case 79 as indicated by an arrow 98.

As shown in FIG. 3, when the eccentric shaft 87 moves to the upper end of the circular cam 88, a central axis of the circular cam 88 moves lower than the eccentric shaft 87. Referring to FIGS. 2 and 3, relative positions of the crank case 79 and the cylinder block 2 are determined according to a distance between a central axis of the circular cam 86 and the central axis of the circular cam 88. The greater the distance between the central axis of the circular cam 86 and the central axis of the circular cam 88, the greater the movement of the cylinder block 2 so as to separate from the crank case 79. The greater the movement of the cylinder block 2 so as to separate from the crank case 79, the greater the volume of the combustion chamber 5.

The compression ratio changing mechanism according to the present embodiment is formed such that the volume of the combustion chamber 5 varies due to a relative movement of the cylinder block 2 with respect to the crank case 79. In the present embodiment, a compression ratio that is solely determined by a stroke volume of the piston from bottom dead center to top dead center and the volume of the combustion chamber when the piston reaches top dead center is referred to as a mechanical compression ratio. The mechanical compression ratio is not dependent on a valve closing timing of the intake valve. The mechanical compression ratio is expressed as (mechanical compression ratio)={(volume of combustion chamber when piston reaches top dead center)+(stroke volume of piston)}/(volume of combustion chamber).

The internal combustion engine according to the present embodiment includes a relative position sensor 89. The relative position sensor 89 detects a relative position of the cylinder block 2 with respect to the crank case 79. The relative position of the piston 3 with respect to the cylinder block 2 when the piston 3 is at top dead center can be acquired from an output of the relative position sensor 89.

In the state shown in FIG. 2, since the volume of the combustion chamber 5 is small, the compression ratio is high if an intake air amount is always constant. This state is a high mechanical compression ratio state. In contrast, in the state shown in FIG. 3, since the volume of the combustion chamber 5 is large, the compression ratio is low if the intake air amount is always constant. This state is a low mechanical compression ratio state. As shown, with the internal combustion engine according to the present embodiment, the compression ratio can be changed during an operation period. For example, the compression ratio can be changed by the compression ratio changing mechanism according to an operational state of the internal combustion engine. The compression ratio changing mechanism is controlled by the electronic control unit 31. In the present embodiment, a motor that rotates the camshafts 84 and 85 is connected to the output port 37 via a corresponding drive circuit 39.

Referring to FIGS. 2 and 3, the internal combustion engine according to the present embodiment has a portion in which the crank case 79 and the cylinder block 2 come into contact with each other and slidingly move. The crank case 79 according to the present embodiment includes a cover part 72 that covers the protrusions 82 of the crank case 79 and the protrusions 80 of the cylinder block 2. The cover part 72 covers a part of the cylinder block 2 from the side. The cover part 72 encloses a side surface of the cylinder block 2. The cover part 72 is in contact with the side surface of the cylinder block 2.

In the internal combustion engine according to the present embodiment, when the compression ratio varies, the cover part 72 of the crank case 79 and the cylinder block 2 slidingly move. A boot sealing 73 as a sealing member is arranged in order to seal a space between the crank case 79 and the cylinder block 2. Both side ends of the boot sealing 73 are fixed to an end of the cover part 72 and to the side surface of the cylinder block 2. By arranging the boot sealing 73 between the supporting structure including the crank case 79 and the cylinder block 2, gas inside the crank case 79 can be prevented from flowing out to the outside of the internal combustion engine.

The boot sealing 73 according to the present embodiment is annularly formed so as to enclose the side surface of the cylinder block 2. The boot sealing 73 deforms in accordance with a change in the mechanical compression ratio. The boot sealing 73 is made of a material that is deformable in accordance with a variation in the mechanical compression ratio. For example, the boot sealing 73 is made of rubber or resin. The sealing member is not limited to this mode and an arbitrary member having a sealing function can be adopted.

Next, control for detecting an occurrence of abnormal combustion in the internal combustion engine according to the present embodiment will be described. Abnormal combustion occurs due to an occurrence of combustion that differs from propagation of desired combustion when, for example, combustion is in progress in which flames gradually spread from an igniting part of a spark plug. Such abnormal combustion includes a knocking phenomenon. In the present embodiment, whether or not abnormal combustion is occurring is determined by acquiring a pressure vibration in the combustion chamber 5 and extracting a pressure vibration dependent on a height of the combustion chamber from the acquired pressure vibration.

Referring to FIGS. 2 and 3, the compression ratio changing mechanism is formed so that the volume of the combustion chamber 5 is variable. In addition, since the relative position of the cylinder block 2 with respect to the crank case 79 varies, the height of the combustion chamber 5 varies. In the invention, a length of the combustion chamber in a direction in which the piston 3 moves is referred to as the height of the combustion chamber 5. In the example shown in FIGS. 2 and 3, the top surface of the combustion chamber 5 is inclined, whereby a portion with a maximum distance between the crown surface of the piston 3 and the top surface of the combustion chamber 5 is referred to as a height H of the combustion chamber 5.

Figure 4:
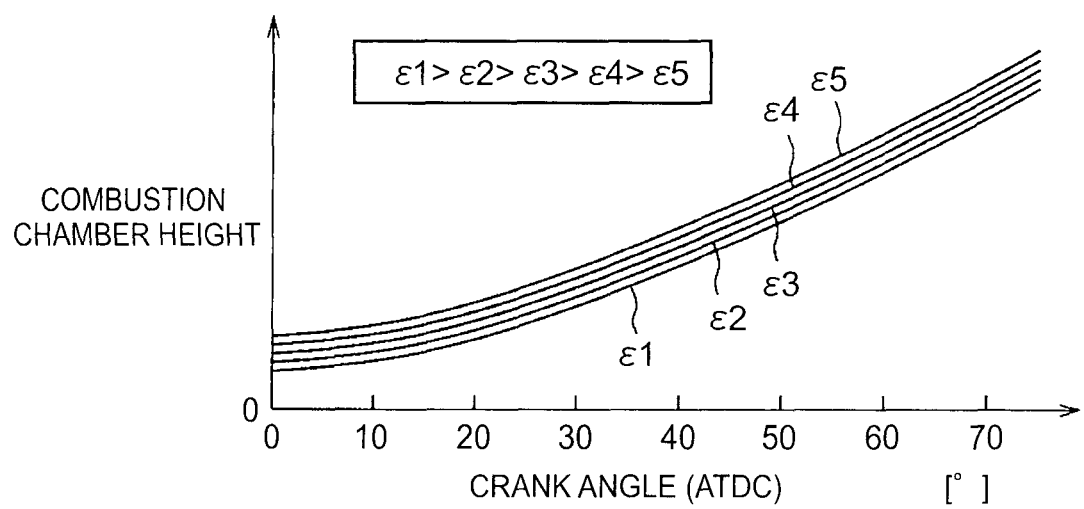
FIG. 4 is a graph showing a relationship of a height of a combustion chamber with respect to a crank angle in the internal combustion engine according to the first embodiment.

FIG. 4 shows a relationship of the height H of the combustion chamber with respect to crank angle when the mechanical compression ratio is varied. For the crank angle plotted on a horizontal axis, 0 degrees is assumed to be a position at which the piston reaches a compression top dead center. FIG. 4 shows a plurality of graphs representing variations in the mechanical compression ratio. A mechanical compression ratio $\epsilon 1$ is highest and a mechanical compression ratio $\epsilon 5$ is lowest ($\epsilon 1 > \epsilon 2 > \epsilon 3 > \epsilon 4 > \epsilon 5$). An example of a range of the mechanical compression ratio is 8 or higher and lower than 21. For each of the mechanical compression ratios $\epsilon 1$ to $\epsilon 5$, the greater the crank angle CA, the greater the height H of the combustion chamber 5. In addition, in comparison with the respective mechanical compression ratios $\epsilon 1$ to $\epsilon 5$, the higher the mechanical compression ratio, the smaller the height H of the combustion chamber 5.

With the internal combustion engine according to the present embodiment, when the mechanical compression ratio is changed, the height H of the combustion chamber 5 varies while a diameter of the combustion chamber 5 does not vary. When abnormal combustion occurs at a prescribed position of the piston 3, a pressure wave occurs. The pressure wave propagates at, for example, the speed of sound and spreads within the combustion chamber 5. At this point, a pressure vibration of gas dependent on a shape of the combustion chamber 5 occurs inside the combustion chamber 5.

Figure 5:
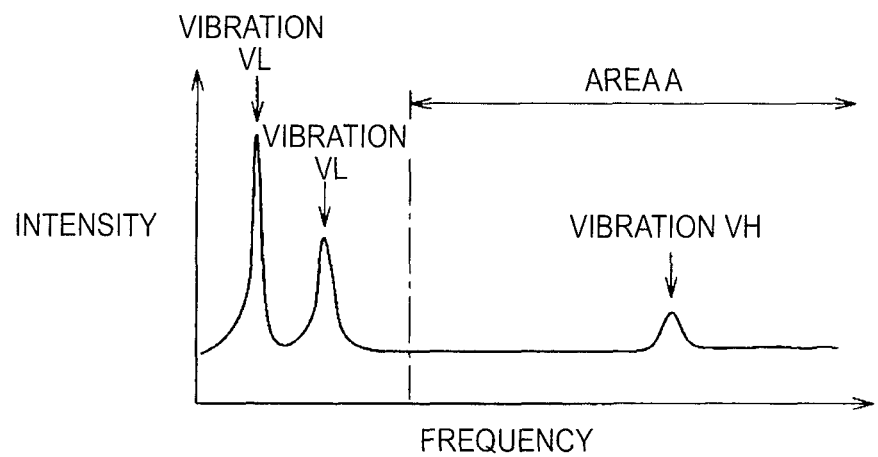
FIG. 5 is a graph explaining a relationship between a frequency of pressure vibration inside a cylinder and intensity.

FIG. 5 shows a graph that schematically explains a relationship between a frequency of a pressure vibration and an intensity of a vibration inside the combustion chamber 5 when abnormal combustion occurs. A horizontal axis represents a frequency of a pressure vibration and a vertical axis represents an intensity of the pressure vibration. Pressure vibration detected by the cylinder internal pressure sensor 61 when abnormal combustion occurs includes pressure vibration VL which occurs in a low-frequency side and pressure vibration VH which occurs in a high-frequency side. A frequency of the low-frequency side pressure vibration VL is, for example, 3 kHz or higher and 15 kHz or lower. A frequency of the high-frequency side pressure vibration VH is, for example, 10 kHz or higher and 100 kHz or lower.

Furthermore, the inventors found that the frequency of the high-frequency side pressure vibration VH is dependent on the height H of the combustion chamber 5. The high-frequency side pressure vibration VH is presumed to be a vibration that resonates in a height direction of the combustion chamber 5. In contrast, the low-frequency side. pressure vibration VL is presumed to be a vibration that resonates in a radial direction of the combustion chamber 5. Moreover, while FIG. 5 shows a vibration of a primary resonance and a vibration of a secondary resonance in the radial direction as the low-frequency side pressure vibration VL, higher order vibrations may further occur. In addition, the example shown in FIG. 5 reveals that the intensity of the high-frequency side pressure vibration VH is lower than the intensity of the low-frequency side pressure vibration VL.

The inventors found that an occurrence of abnormal combustion can be detected with high accuracy by using the high-frequency side pressure vibration VH. In this embodiment of the invention, an occurrence of abnormal combustion is detected by eliminating the low-frequency side pressure vibration VL and selectively extracting the high-frequency side pressure vibration VH. In FIG. 5, abnormal combustion is detected using a pressure vibration in, for example, an area A of 10 kHz or higher.

Figure 6:
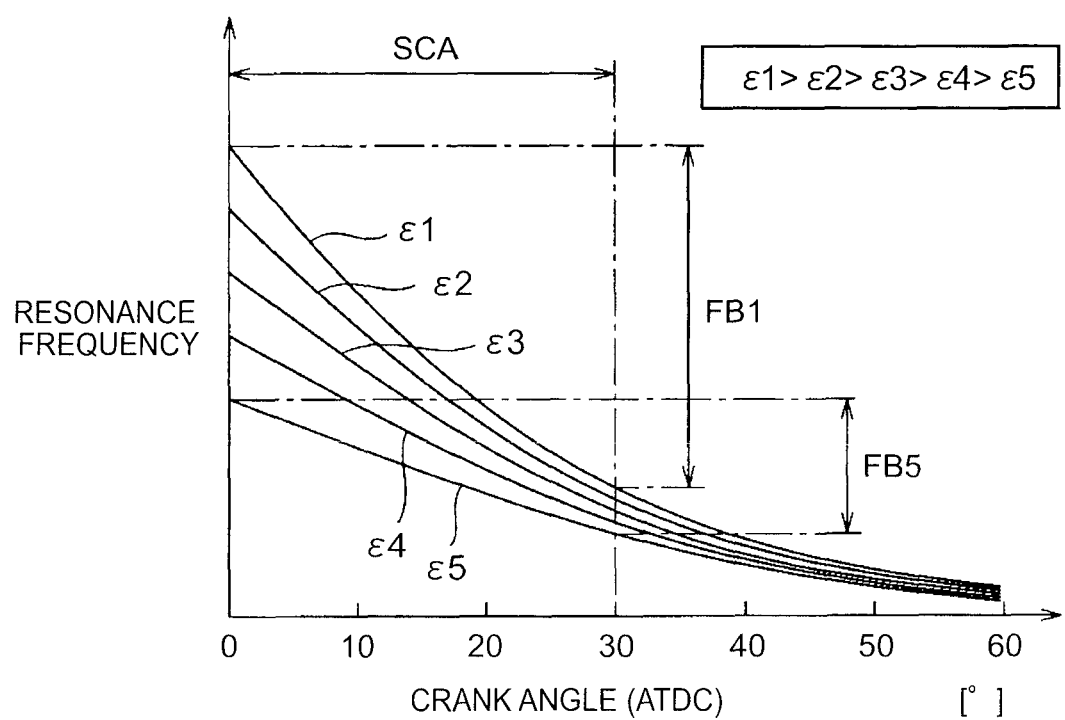
FIG. 6 is a graph explaining a section in which abnormal combustion occurs and a frequency band of a band pass filter according to the first embodiment.

FIG. 6 shows a graph explaining a resonance frequency in the combustion chamber 5, corresponding to crank angle. A horizontal axis represents a resonance frequency of a pressure wave in which nodes of vibration are aligned in the height direction of the combustion chamber 5. In other words, the horizontal axis represents a resonance frequency of a vibration in the height direction of the combustion chamber 5. For each of the mechanical compression ratios $\epsilon 1$ to $\epsilon 5$, since the greater the crank angle CA, the greater the height H of the combustion chamber 5, the lower the resonance frequency in the combustion chamber 5. In addition, for the plurality of mechanical compression ratios $\epsilon 1$ to $\epsilon 5$, the higher the mechanical compression ratio, the higher the resonance frequency.

In this case, a frequency of a pressure vibration of gas inside the combustion chamber 5 is not directly related to a natural frequency of the engine body 1 and is dependent on a shape or the like of the combustion chamber 5 when the pressure wave is created. In addition, a pressure vibration when abnormal combustion occurs includes the high-frequency side pressure vibration VH that resonates in the height direction of the combustion chamber 5. In this embodiment of the invention, the high-frequency side pressure vibration VH will be referred to as a specific pressure vibration. A specific pressure vibration is considered to be a vibration that occurs in the height direction of the combustion chamber and has a high frequency as described above. In the present embodiment, a vibration in a frequency band in which a specific pressure vibration occurs is extracted from the pressure vibration acquired by the cylinder internal pressure sensor 61.

When the mechanical compression ratio varies, a frequency of the specific pressure vibration created by abnormal combustion varies. The internal combustion engine according to the present embodiment includes an abnormal combustion detector including a filter. The filter passes a pressure signal in a set frequency band among the pressure signal acquired by the cylinder internal pressure sensor 61. The abnormal combustion detector detects an occurrence of abnormal combustion based on a result of a signal having passed through the filter. In the present embodiment, the electronic control unit 31 functions as an abnormal combustion detector.

A band pass filter (BPF) can be used as the filter. A vibration of a set frequency band can be extracted by the band pass filter. The band pass filter according to the present embodiment is capable of changing a frequency band of a pressure signal that is passed through the band pass filter. In the present embodiment, the electronic control unit 31 functions as a band pass filter and electrically processes pressure signals.

It is difficult to identify a crank angle at which abnormal combustion occurs for each combustion cycle. With the internal combustion engine according to the present embodiment, a crank angle section SCA at which abnormal combustion occurs is set. In the present embodiment, the crank angle section SCA at which abnormal combustion occurs is determined in advance. In an example shown herein, a section is set in which the crank angle is 0 degrees or more and 30 degrees or less.

In the example shown in FIG. 6, at the mechanical compression ratio $\epsilon 1$ that is a high mechanical compression ratio, a frequency of a specific pressure vibration caused by abnormal combustion is within a frequency band FB1. In addition, at the mechanical compression ratio $\epsilon 5$ that is a low mechanical compression ratio, a frequency of a specific pressure vibration caused by abnormal combustion is within a frequency band FB5. It is shown that the frequency band of a specific pressure vibration due to abnormal combustion differs for each value of the mechanical compression ratio.

Comparing the frequency band FB1 with the frequency band FB5, the frequency band FB1 at a high mechanical compression ratio is arranged on a high frequency side of the frequency band FB5 at a low mechanical compression ratio. A maximum frequency of the frequency band FB1 is higher than a maximum frequency of the frequency band FB5, and a minimum frequency of the frequency band FB1 is higher than a minimum frequency of the frequency band FB5. In addition, comparing frequency widths of the frequency bands, the frequency width of the frequency band FB1 at a high mechanical compression ratio is greater than the frequency width of the frequency band FB5 at a low mechanical compression ratio.

The internal combustion engine according to the present embodiment is formed so as to set a frequency band of the filter in accordance with a variation in the mechanical compression ratio. For example, in the case of the mechanical compression ratio $\epsilon 1$, the filter is set to the frequency band FB1, and in the case of the mechanical compression ratio $\epsilon 5$, the filter is set to the frequency band FB5. Frequency bands of filters based on a section SCA in which abnormal combustion occurs can also be set in a similar manner for the other mechanical compression ratios $\epsilon 2$ to $\epsilon 4$. In this case, the frequency band of the filter is not only moved in parallel toward a low frequency side or a high frequency side but a frequency width of the frequency band is also varied. After the frequency band of the filter is set, an occurrence of abnormal combustion is determined by detecting a magnitude of a vibration of a pressure signal having passed through the filter and comparing the magnitude of the vibration with a determination value.

Figure 7:
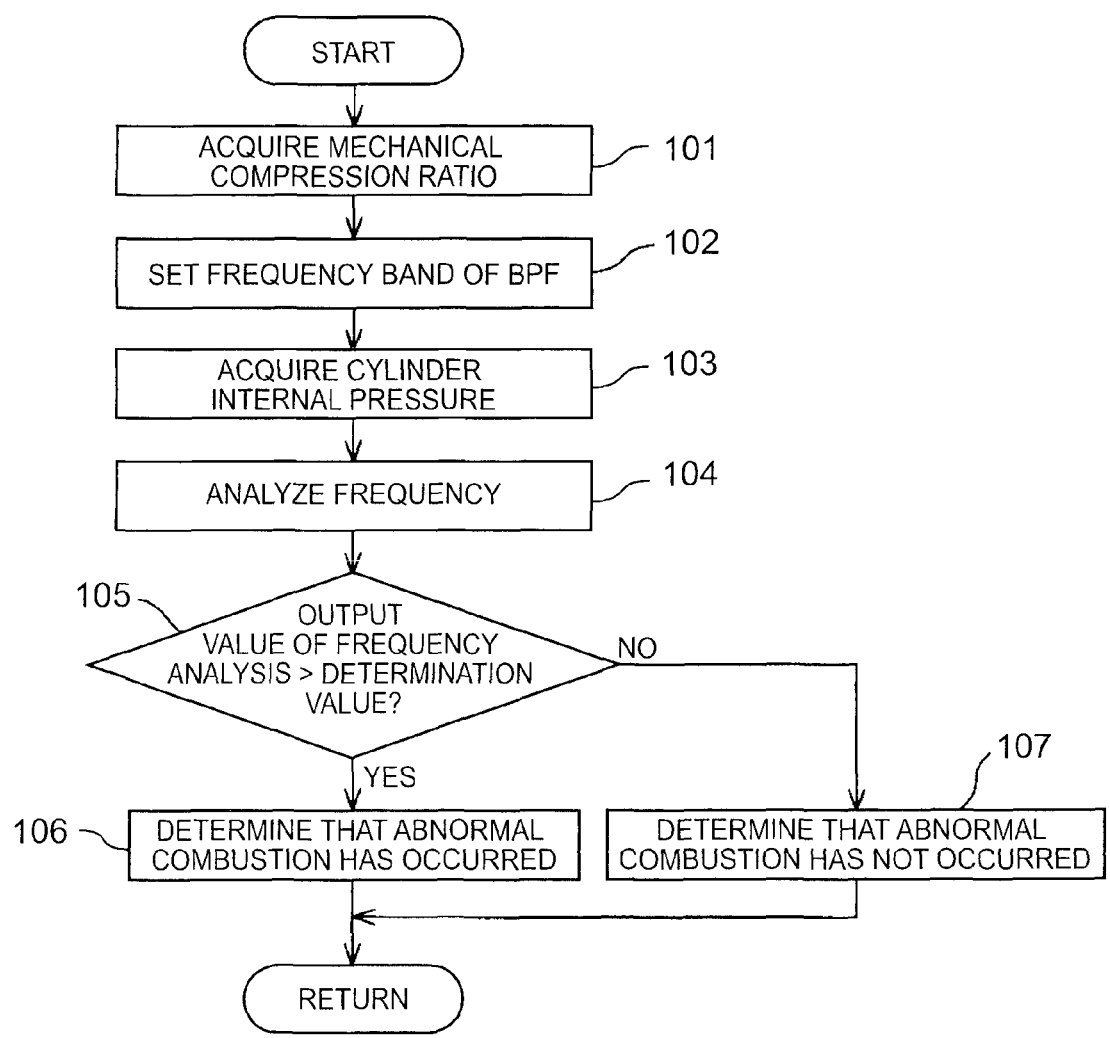
FIG. 7 is a flow chart of control for determining an occurrence of abnormal combustion according to the first embodiment.

FIG. 7 is a flow chart of control for determining an occurrence of abnormal combustion according to the present embodiment. For example, the control shown in FIG. 7 can be repetitively performed every time interval determined in advance.

In step 101, a present mechanical compression ratio is acquired. The height H of the combustion chamber 5 when the piston 3 has reached top dead center can be computed from an output of the relative position sensor 89 (refer to FIGS. 2 and 3). The mechanical compression ratio can be computed using the height H of the combustion chamber 5. Acquisition of the mechanical compression ratio is not limited to this mode and the mechanical compression ratio can be acquired using an arbitrary apparatus. For example, the mechanical compression ratio may be detected based on a control signal of a motor that drives the compression ratio changing mechanism.

Referring to FIG. 7, next, in step 102, the frequency band of the band pass filter is set. In the present embodiment, the frequency band of the filter is set based on a crank angle section in which abnormal combustion occurs and on the mechanical compression ratio as described earlier. Referring to FIG. 6, in the present embodiment, a constant value is adopted as the crank angle section SCA in which abnormal combustion occurs. Therefore, for example, in the case of the mechanical compression ratio $\epsilon 1$, the frequency band of the filter can be set to the frequency band FB1. As such frequency bands of the filter, values obtained by functionalizing the mechanical compression ratios can be stored in the electronic control unit 31 in advance.

Referring to FIG. 7, in step 103, cylinder internal pressure is acquired. In the present embodiment, pressure in the combustion chamber 5 is detected by the cylinder internal pressure sensor 61. For example, cylinder internal pressure can be acquired for each time interval determined in advance.

Figure 8:
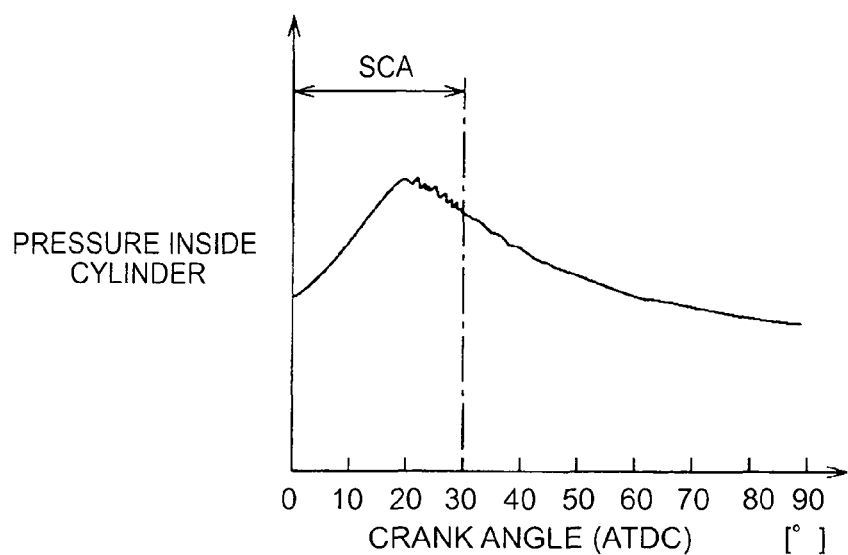
FIG. 8 is a graph showing a relationship between a crank angle and detected internal pressure of a cylinder.

FIG. 8 shows a graph of internal pressure of a cylinder acquired by the cylinder internal pressure sensor 61. In the example shown in FIG. 8, a vibration has occurred in the internal pressure of a cylinder in a crank angle area of 20 degrees or more and 30 degrees or less. In other words, abnormal combustion has occurred in this crank angle section. Referring to FIG. 7, in step 103, a pressure signal can be acquired so as to include at least a section in which abnormal combustion occurs. In the present embodiment, since the crank angle section SCA in which abnormal combustion occurs is determined in advance, internal pressure of a cylinder can be acquired in a section including the section SCA.

A cylinder internal pressure acquiring unit that acquires internal pressure of a cylinder is not limited to the cylinder internal pressure sensor described above. Any apparatus capable of acquiring a pressure wave of a specific pressure vibration that is dependent on a height of the combustion chamber can be adopted as the cylinder internal pressure acquiring unit.

Next, in step 104, frequency analysis is performed. The internal combustion engine according to the present embodiment includes an frequency analyzing apparatus having a band pass filter. In the present embodiment, the electronic control unit 31 functions as a frequency analyzing apparatus. The pressure signal acquired by the cylinder internal pressure sensor 61 includes vibrations of various frequencies. The frequency analyzing apparatus extracts a pressure signal included in the frequency band set to the band pass filter among the pressure signal having various frequencies.

Referring to FIG. 6, for example, in the case of the mechanical compression ratio $\epsilon 1$, the band pass filter is set to the frequency band FB1. In this case, a pressure signal having a frequency within the range of the frequency band FB1 is extracted through the band pass filter. On the other hand, a pressure signal having a frequency outside the range of the frequency band FB1 is eliminated or attenuated by the band pass filter. In this manner, a signal indicating a specific pressure vibration used for determining an occurrence of abnormal combustion can be extracted and a signal having a frequency that is not required for determining an occurrence of abnormal combustion can be eliminated.

Figure 9:
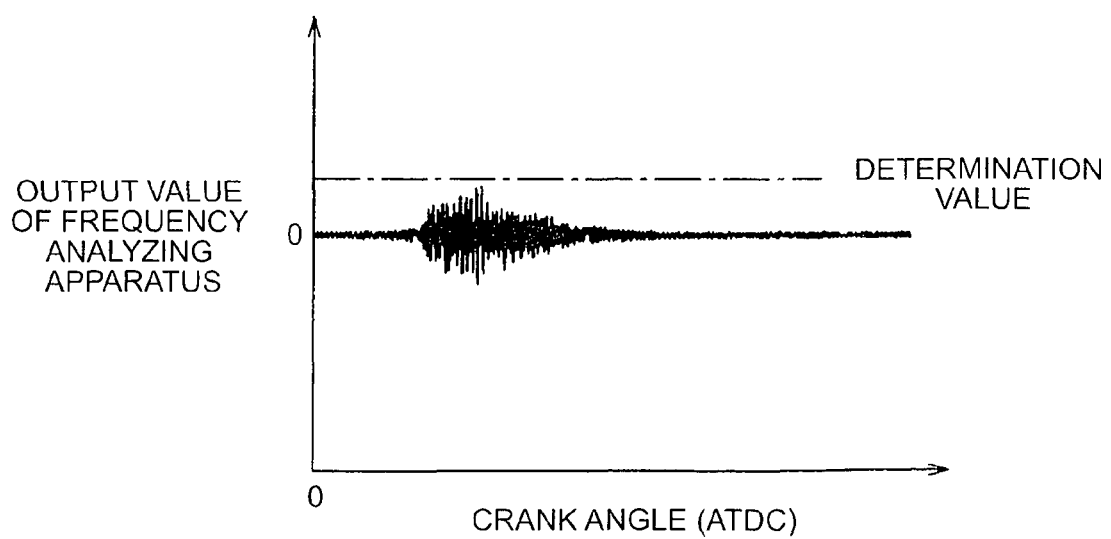
FIG. 9 is a graph explaining a relationship between a crank angle and an output value of a frequency analyzing apparatus.

FIG. 9 shows a graph of output values of the frequency analyzing apparatus. An output value of the frequency analyzing apparatus which is plotted on a vertical axis corresponds to, for example, an amplitude of a pressure vibration of cylinder internal pressure. When the output value of the frequency analyzing apparatus is zero, a determination that a pressure vibration has not occurred in the cylinder can be made. In addition, when the output value of the frequency analyzing apparatus has increased, a determination that a pressure vibration in the cylinder has increased can be made. In the present embodiment, a determination value corresponding to an output value of the frequency analyzing apparatus is determined in advance.

Referring to FIG. 7, in step 105, a determination is made on whether or not the output value of the frequency analyzing apparatus exceeds a determination value that is determined in advance. In step 105, when the output value of the frequency analyzing apparatus exceeds the determination value that is determined in advance, the control proceeds to step 106. In step 106, a determination that abnormal combustion has occurred can be made. On the other hand, in step 105, when the output value of the frequency analyzing apparatus is equal to or smaller than the determination value that is determined in advance, the control proceeds to step 107. In step 107, a determination that abnormal combustion has not occurred can be made.

The determination value for determining an occurrence of abnormal combustion may be set in plurality. For example, a determination may be made by providing a first determination value, a second determination value, a third determination value, and the like. The first determination value is for determining an occurrence of a small knocking phenomenon. The second determination value is for determining an occurrence of a knocking phenomenon of an intermediate magnitude. The third determination value is for determining an occurrence of a large knocking phenomenon. Alternatively, instead of setting a determination value on a positive side of the output value of the frequency analyzing apparatus, a determination value may be set on a negative side. In this case, a determination that abnormal combustion has occurred can be made when the output value of the frequency analyzing apparatus falls below a negative determination value.

As shown, with the internal combustion engine according to the present embodiment, the frequency band of the band pass filter is changed in accordance with the mechanical compression ratio. The frequency band of the band pass filter which passes a signal is set to a high frequency side as the mechanical compression ratio becomes higher. Furthermore, a frequency width of the frequency band of the band pass filter is changed in accordance with the mechanical compression ratio. The higher the mechanical compression ratio, the greater the frequency width. According to this configuration, a pressure vibration attributable to abnormal combustion can be detected with high accuracy.

For example, even if a crank angle section in which a knocking occurs is the same, the higher the mechanical compression ratio, the greater the frequency width of the frequency band in which abnormal combustion occurs. When detecting pressure vibrations at all mechanical compression ratios using a single frequency band, reducing the frequency width of the frequency band of the band pass filter may prevent a part of pressure vibrations attributable to abnormal combustion from being detected. Therefore, when detecting pressure vibrations at all mechanical compression ratios using a single frequency band, the frequency band of the band pass filter must be increased.

For example, in FIG. 6, when a single frequency band is set to the band pass filter, a frequency band including both the frequency band FB1 and the frequency band FB5 must be set. Therefore, pressure vibrations are extracted from a band that is larger than an originally required band and as the results, more noise is extracted. Therefore, accuracy of determination of an occurrence of abnormal combustion declines. In contrast, in the present embodiment, since the frequency width of the frequency band of the band pass filter is changed in accordance with the mechanical compression ratio, a large portion of the noise can be eliminated. Resistance to noise when processing a, pressure signal can be improved. As a result, accuracy of determination of an occurrence of abnormal combustion increases.

With the internal combustion engine according to the present embodiment, pressure of the combustion chamber 5 is directly detected. In particular, the cylinder internal pressure sensor 61 is arranged in a central part of the top surface of the combustion chamber 5. A pressure vibration attributable to abnormal combustion is propagated to the engine body 1 including the cylinder block 2 and the cylinder head 4. When a sensor that detects vibration is arranged on a side surface of the cylinder block 2, the pressure vibration of the combustion chamber 5 is detected via the engine body 1. The vibration detected at this point is affected by the natural frequency of the engine body 1. In contrast, in the present embodiment, since internal pressure of a cylinder is acquired, the effect of the natural frequency of the engine body 1 is suppressed and a pressure vibration in the combustion chamber 5 can be acquired with higher accuracy.

Further referring to FIG. 1, the crank case 79 according to the present embodiment includes a cover part 72 that slidingly moves on the cylinder block 2 and the boot sealing 73. Therefore, arranging a sensor for detecting a vibration of the cylinder block 2 on the side surface of the cylinder block 2 may be difficult or positions where the sensor is arranged may be limited. In contrast, with the internal combustion engine according to the present embodiment, since the cylinder internal pressure sensor 61 is inserted from above the cylinder head 4, the sensor can be readily attached.

While a band pass filter is used as the filter for passing a pressure signal having a frequency within a set frequency band in the present embodiment, this mode is not limited to the present embodiment. Any filter capable of extracting a pressure signal having a frequency within a prescribed frequency band among a pressure signal of the cylinder internal pressure sensor can be adopted. Alternatively, as the filter, an apparatus that extracts a pressure signal of a set frequency band may be arranged between the electronic control unit 31 and the cylinder internal pressure sensor 61.

While an internal combustion engine in which a valve closing timing of the intake valve is constant is exemplified in the embodiment described above, this mode is not limited to the embodiment. The invention can also be applied to an internal combustion engine including a variable valve mechanism that varies the valve closing timing of the intake valve. With an internal combustion engine including a variable valve mechanism, an actual compression ratio in a combustion chamber is set in addition to a mechanical compression ratio. The actual compression ratio is dependent on the valve closing timing of the intake valve. For example, the actual compression ratio is set as (actual compression ratio)={(volume of combustion chamber when piston reaches top dead center)+(volume corresponding to the piston movement's distance when intake valve is closed)

}/(volume of combustion chamber). Even with such an internal combustion engine including a variable valve mechanism, the frequency band of the filter can be changed based on the mechanical compression ratio.

The compression ratio changing mechanism according to the present embodiment changes the mechanical compression ratio by relatively moving the cylinder block with respect to the crank case. However, this mode is not limited to the embodiment. As the compression ratio changing mechanism, any mechanism capable of changing the height of the combustion chamber can be adopted.

An internal combustion engine according to a second embodiment of the invention will be described with reference to FIGS. 10 and 11. The internal combustion engine according to the present embodiment includes an ignition timing detector that detects an ignition timing as an operational state of the internal combustion engine. The abnormal combustion detector sets a frequency band of the filter based on the ignition timing. With the internal combustion engine according to the present embodiment, a crank angle section SCA at which abnormal combustion occurs is changed in accordance with the ignition timing.

Figure 10:
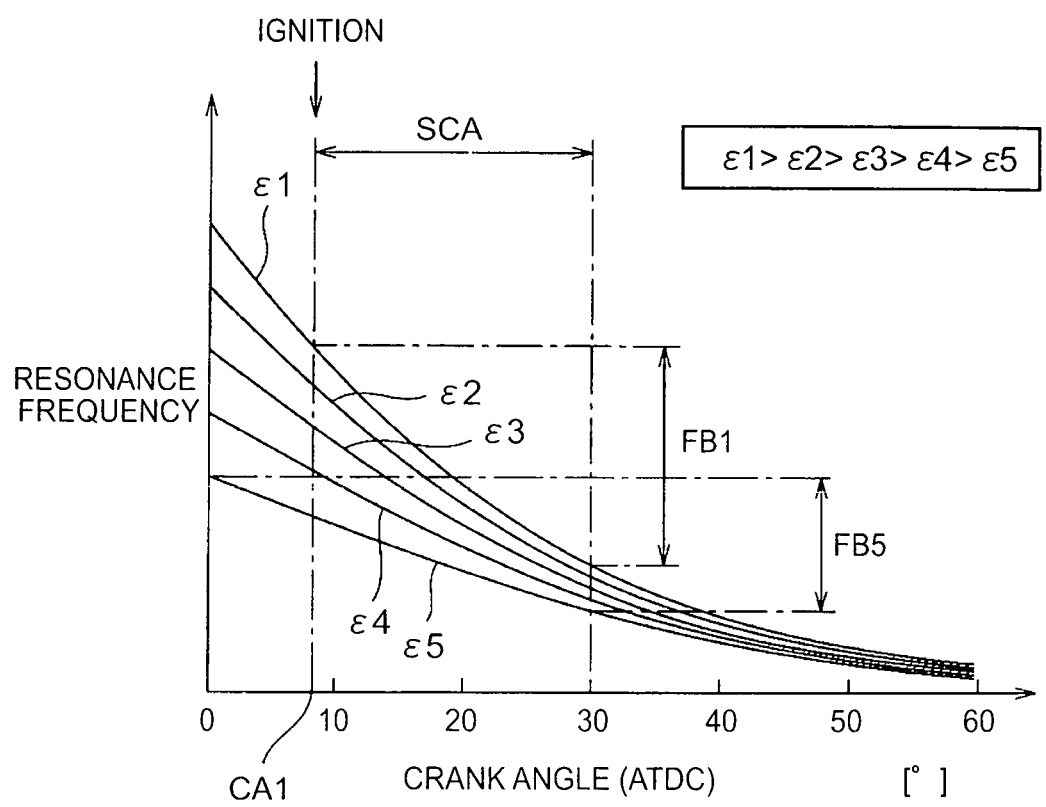
FIG. 10 is a graph explaining a section in which abnormal combustion occurs and a frequency band of a band pass filter according to a second embodiment.

FIG. 10 is a graph of a resonance frequency of a vibration in a height direction of the combustion chamber, corresponding to a crank angle for a plurality of mechanical compression ratios according to the present embodiment. Abnormal combustion such as a knocking occurs during propagation of flames in the combustion chamber 5. In other words, abnormal combustion such as a knocking occurs after ignition takes place in the combustion chamber 5. Therefore, the abnormal combustion detector according to the present embodiment performs control for setting the crank angle section SCA at which abnormal combustion occurs to or after an ignition timing.

In the example shown in FIG. 10, ignition takes place at a crank angle CA1. In this case, as the crank angle section SCA at which abnormal combustion occurs, a section from the crank angle CA1 to an angle determined in advance can be set. The frequency band of the band pass filter can be set based on the section SCA in a similar manner to the first embodiment. For example, in the case of the high mechanical compression ratio $\epsilon 1$, the frequency band FB1 can be set. In the case of the low mechanical compression ratio $\epsilon 5$, the frequency band FB5 can be set.

Comparing FIG. 10 with FIG. 6 according to the first embodiment, the crank angle section SCA at which abnormal combustion occurs according to the present embodiment is smaller than the crank angle section SCA according to the first embodiment. It is also shown that the frequency bands FB1 and FB5 of the band pass filter are smaller than those of the first embodiment. Therefore, noise included in a pressure signal can be reduced. As a result, detection accuracy of an occurrence of abnormal combustion can be improved.

In particular, when the mechanical compression ratio is high, a frequency width of the frequency band of the band pass filter increases. Therefore, by limiting the crank angle section SCA at which abnormal combustion occurs to or after an ignition timing, the frequency band of the band pass filter can be narrowed and noise can be effectively reduced.

Figure 11:
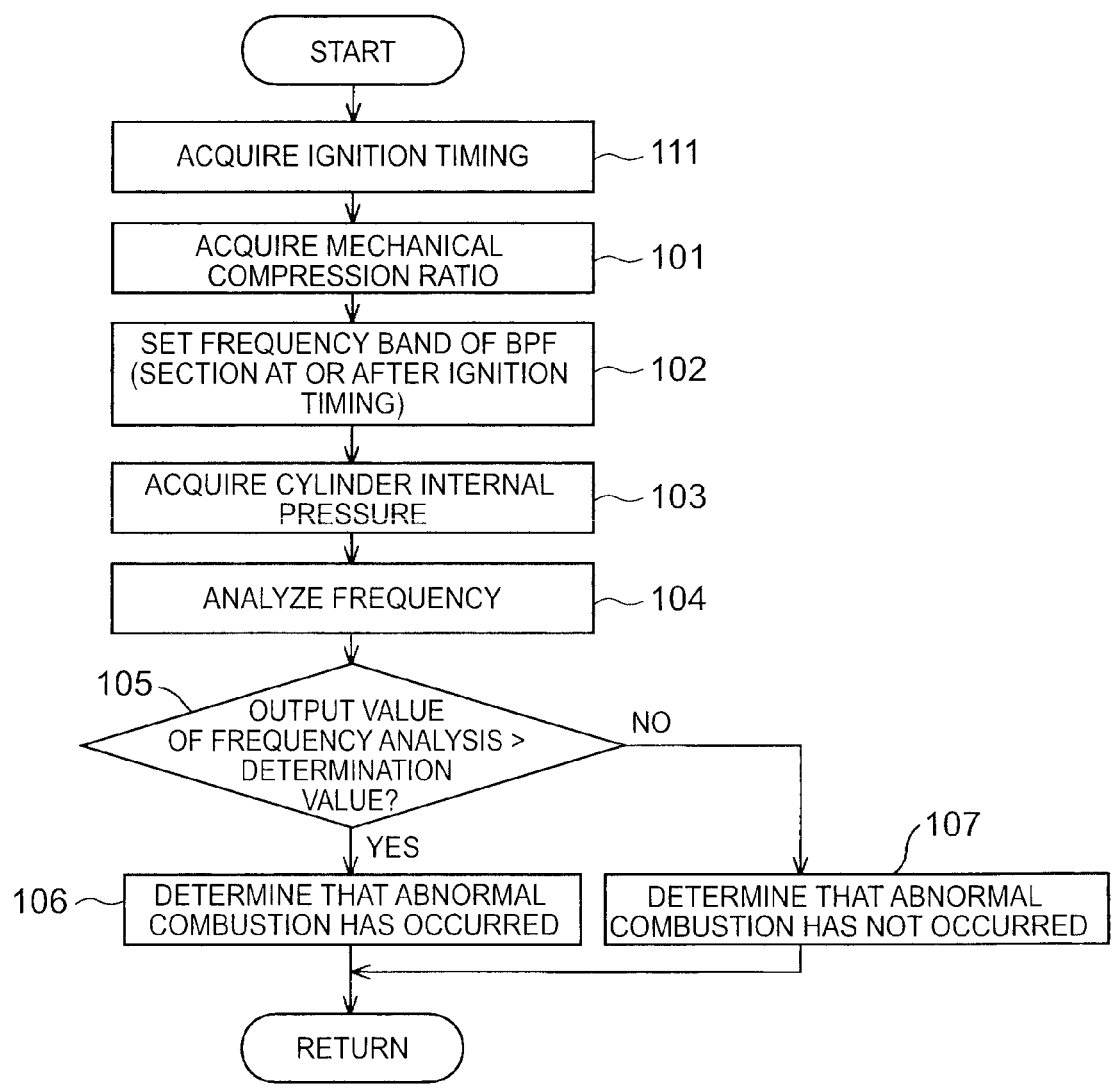
FIG. 11 is a flow chart of control for determining an occurrence of abnormal combustion according to the second embodiment.

FIG. 11 is a flow chart of control for determining an occurrence of abnormal combustion according to the present embodiment. In step 111, an ignition timing is acquired. In the present embodiment, the electronic control unit 31 functions as an ignition timing detector. The electronic control unit 31 reads in a set ignition timing. In step 101, a mechanical compression ratio is acquired.

Next, in step 102, a frequency band of the band pass filter is set. As shown in FIG. 10, a frequency band of the band pass filter based on a section at or after the ignition timing is set. When the ignition timing is variable, the frequency band of the band pass filter can be set based on the ignition timing and the mechanical compression ratio. For example, a map of the frequency band of the band pass filter which functionalizes the ignition timing and the mechanical compression ratio can be stored in the electronic control unit 31 in advance.

Subsequent steps 103 to 107 are similar to those of the control of the internal combustion engine according to the first embodiment (refer to FIG. 7). In step 104, a signal indicating a pressure vibration can be extracted in the frequency band set in step 102.

With the control of the internal combustion engine according to the present embodiment, a vibration having a frequency within a frequency band corresponding to a crank angle section prior to the ignition timing can be eliminated and noise can be reduced.

Since other components, operations, and effects are similar to those of the first embodiment, descriptions thereof will not be repeated here.

An internal combustion engine according to a third embodiment of the invention will be described with reference to FIGS. 12 to 17. The internal combustion engine according to the present embodiment includes a rotational speed detector that detects an engine rotational speed as an operational state of the internal combustion engine. The abnormal combustion detector sets a frequency band of the filter based on the engine rotational speed.

Figure 12:
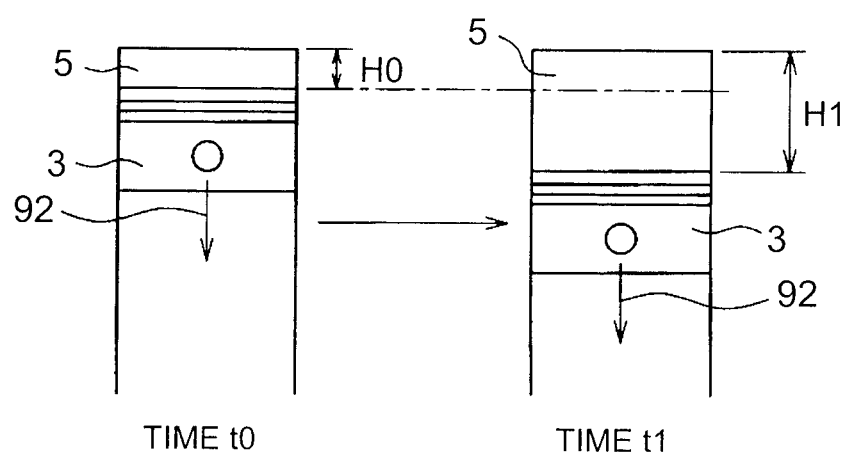
FIG. 12 is a schematic diagram for explaining a variation in a height of a combustion chamber at a low rotational speed according to a third embodiment.
Figure 13:
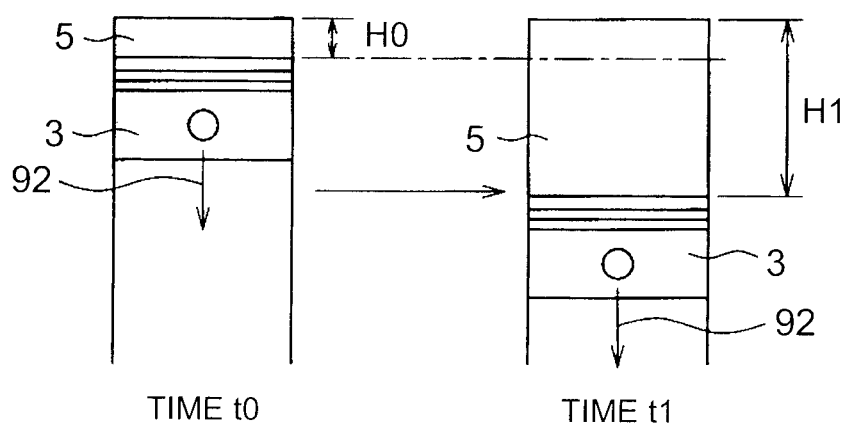
FIG. 13 is a schematic diagram for explaining a variation in a height of a combustion chamber at a high rotational speed according to the third embodiment.

FIG. 12 shows a schematic diagram explaining a movement of the piston 3 when the engine rotational speed is low. FIG. 13 shows a schematic diagram explaining a movement of the piston 3 when the engine rotational speed is high. Referring to FIG. 12, the piston 3 descends in a direction indicated by an arrow 92. At time t0, a height of the combustion chamber 5 is H0. At time t1 after a lapse of a prescribed period of time, the piston 3 descends and a height of the combustion chamber 5 is H1. FIG. 13 similarly shows heights H0 and H1 of the combustion chamber at time t0 and time t1.

Referring to FIGS. 12 and 13, when the engine rotational speed is a high rotational speed, a speed at which the piston 3 descends is greater than when the engine rotational speed is a low rotational speed. Therefore, even if the position of the piston 3 at time t0 is the same, at time t1 after a lapse of a prescribed period of time, a movement amount of the piston 3 is greater at a high rotational speed than at a low rotational speed. At time t1, the height H1 of the combustion chamber is greater at a high rotational speed than at a low rotational speed.

The resonance frequency corresponding to the crank angle shown in FIG. 6 according to the first embodiment represents a case where the height H of the combustion chamber 5 is constant. In other words, a resonance frequency is shown for a case of approximation that the height H of the combustion chamber 5 has not varied from the time at which a knocking had occurred in the combustion chamber 5. However, in an actual internal combustion engine, the piston 3 moves even during a period in which a pressure vibration due to abnormal combustion is occurring. Since the height H of the combustion chamber 5 varies, the frequency of a specific pressure vibration due to abnormal combustion also varies. In consideration thereof, in the present embodiment, an engine rotational speed is detected and the frequency band of the filter is changed in accordance with the engine rotational speed.

As shown in FIGS. 12 and 13, the higher the engine rotational speed, the higher the descending speed of the piston 3 and the greater the height H1 of the combustion chamber 5. Therefore, the higher the engine rotational speed, the lower the frequency of the specific pressure vibration when the abnormal combustion occurs. In the present embodiment, an engine rotational speed is acquired, and the higher the acquired engine rotational speed, the more the frequency band of the filter is corrected to a lower frequency side.

Figure 14:
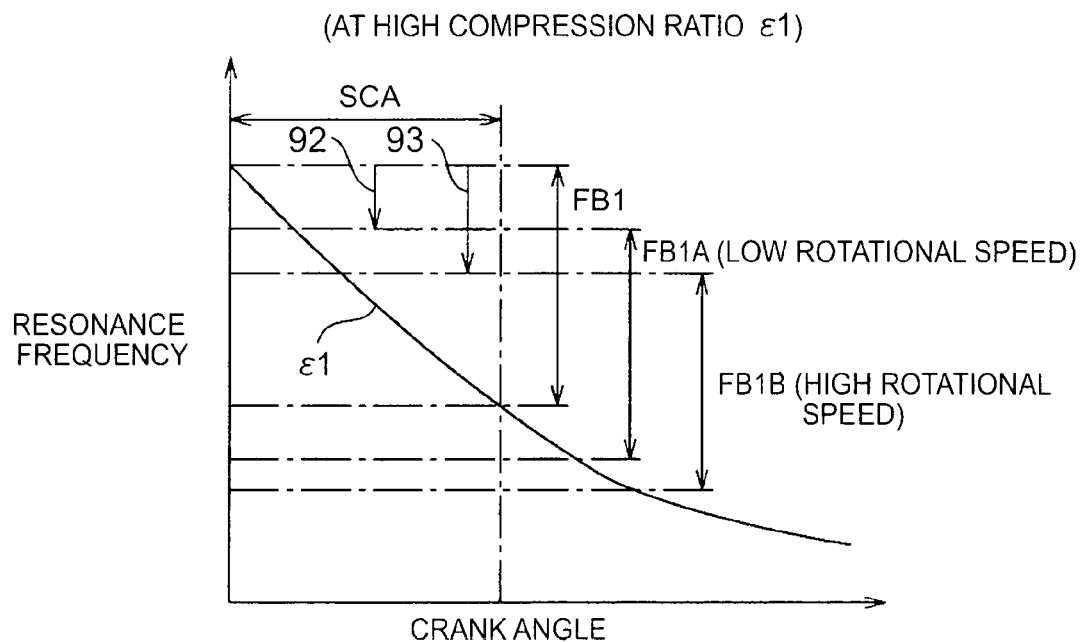
FIG. 14 is a graph explaining a frequency band of a band pass filter at a high compression ratio according to the third embodiment.

FIG. 14 shows a graph of a resonance frequency corresponding to a crank angle when the mechanical compression ratio is high. When the internal combustion engine has a mechanical compression ratio of $\epsilon 1$ and a variation in the height H of the combustion chamber 5 during a period in which abnormal combustion is occurring is not considered, the band pass filter can be set to the frequency band FB1 as described earlier. However, in the present embodiment, the frequency band FB1 is corrected in consideration of the fact that the piston 3 descends during a period in which abnormal combustion is occurring.

When the engine rotational speed is low, the frequency band FB1 is corrected to a frequency band FB1A as indicated by an arrow 92. In addition, when the engine rotational speed is high, the frequency band FB1 is corrected to a frequency band FB1B as indicated by an arrow 93. As shown, the frequency band FB1 varies to the low frequency side as the engine rotational speed increases. By performing this control, the frequency band of the band pass filter can be more accurately associated with the frequency of the specific pressure vibration included in a pressure vibration due to abnormal combustion. As a result, a detection accuracy of abnormal combustion is improved.

In the present embodiment, the frequency band FB1 of the filter is corrected so that a width of the crank angle section SCA at which abnormal combustion occurs becomes approximately constant. Therefore, a frequency width of the frequency band FB1B at high rotational speed is smaller than a frequency width of the frequency band F1AB at low rotational speed. In other words, the higher the engine rotational speed, the smaller the frequency width of the frequency band of the band pass filter.

Figure 15:
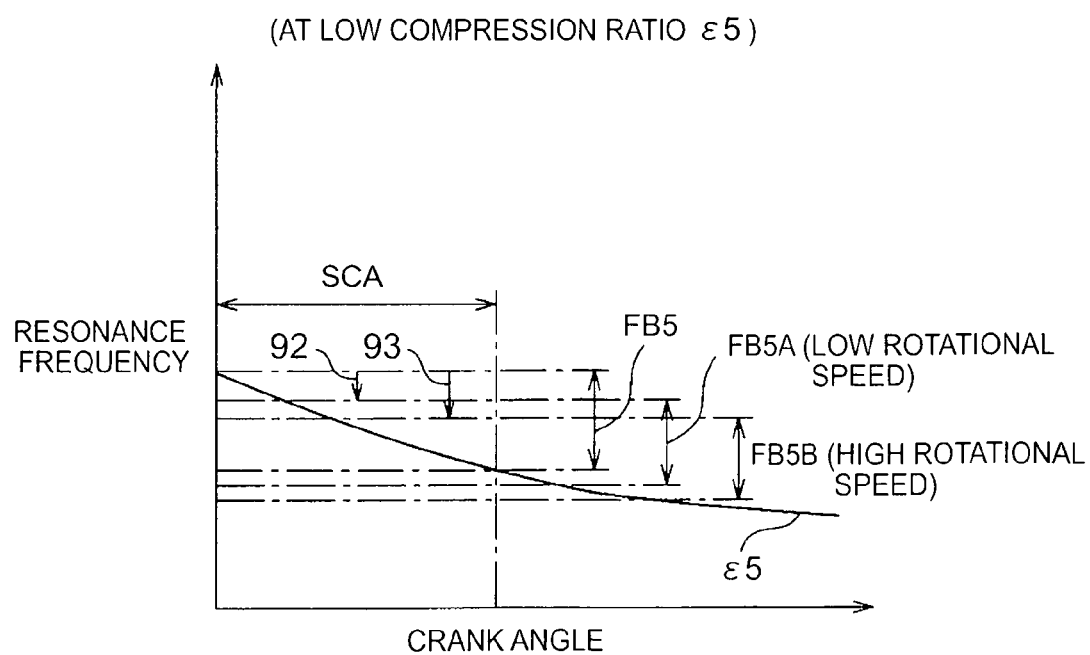
FIG. 15 is a graph explaining a frequency band of a band pass filter at a low compression ratio according to the third embodiment.

FIG. 15 shows a graph of a resonance frequency corresponding to a crank angle when the mechanical compression ratio is low. Even in the case of the low mechanical compression ratio $\epsilon 5$, when a movement of the piston during a period in which abnormal combustion is occurring is not taken into consideration, the band pass filter can be set to the frequency band FB5. Even in the case of a low mechanical compression ratio, when the engine rotational speed is low, the frequency band FB5 can be corrected as indicated by an arrow 92 and a frequency band FB5A can be set. When the engine rotational speed is high, the frequency band FB5 can be corrected as indicated by an arrow 93 and a frequency band FB5B can be set. Furthermore, the frequency band FB5 of the band pass filter can be corrected so that a width of the crank angle section SCA at which abnormal combustion occurs during correction of the frequency band FB5 of the band pass filter becomes approximately constant.

While the frequency width of the frequency band of the band pass filter is smaller after correction than before correction in the present embodiment, this mode is not limited to the embodiment. The frequency width of the frequency band of the band pass filter may be made the same after correction and before correction. In other words, when performing correction as indicated by the arrow 92 or 93, the frequency width of the frequency band may be kept constant.

Referring to FIGS. 14 and 15, the arrows 92 and 93 indicate a correction amount by which the frequency band of the band pass filter is moved. It is shown that the correction amount is smaller at the low mechanical compression ratio $\epsilon 5$ than at the high mechanical compression ratio $\epsilon 1$. The greater the mechanical compression ratio, the greater a gradient of resonance frequency. Therefore, the greater the mechanical compression ratio, the greater the correction amount of the frequency band. For example, the correction amount can be determined in advance for each of a plurality of mechanical compression ratios.

Figure 16:
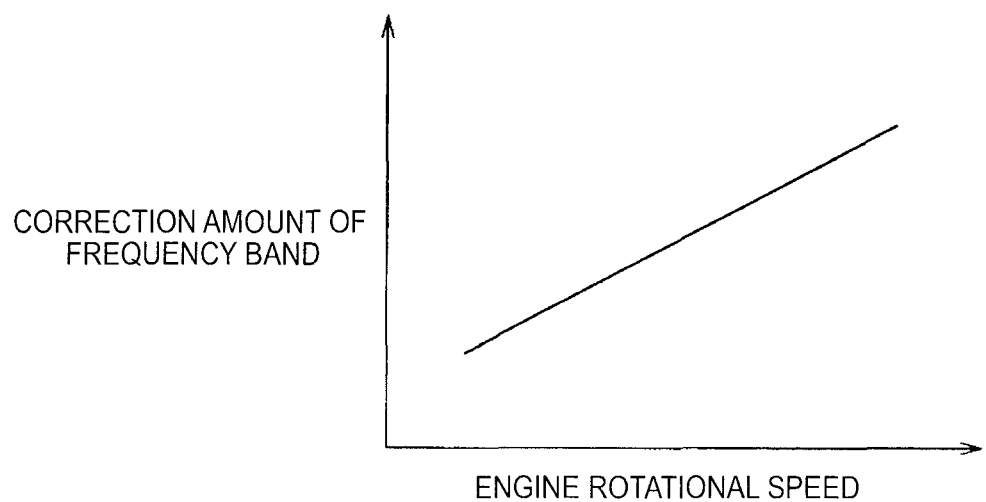
FIG. 16 is a graph explaining a relationship between an engine rotational speed and a correction amount of a frequency band of a band pass filter according to the third embodiment.

FIG. 16 is a graph of a correction amount of a frequency band corresponding to an engine rotational speed at one mechanical compression ratio. A correction amount of a frequency band plotted on a vertical axis represents an amount of movement to a frequency-lowering side. For example, correction amounts of a frequency band that functionalizes an engine rotational speed can be set for each of a plurality of mechanical compression ratios. Furthermore, a correction amount of a frequency width of a frequency band that functionalizes an engine rotational speed can be set. Alternatively, a correction amount can be set which moves respective values of an upper limit frequency and a lower limit frequency of a frequency band.

A correction amount of the frequency band of the band pass filter, a correction amount of a frequency width of the frequency band, and the like according to the present embodiment can be stored in the electronic control unit 31 in advance. The electronic control unit 31 can set the frequency band of the band pass filter based on the mechanical compression ratio and the engine rotational speed.

Figure 17:
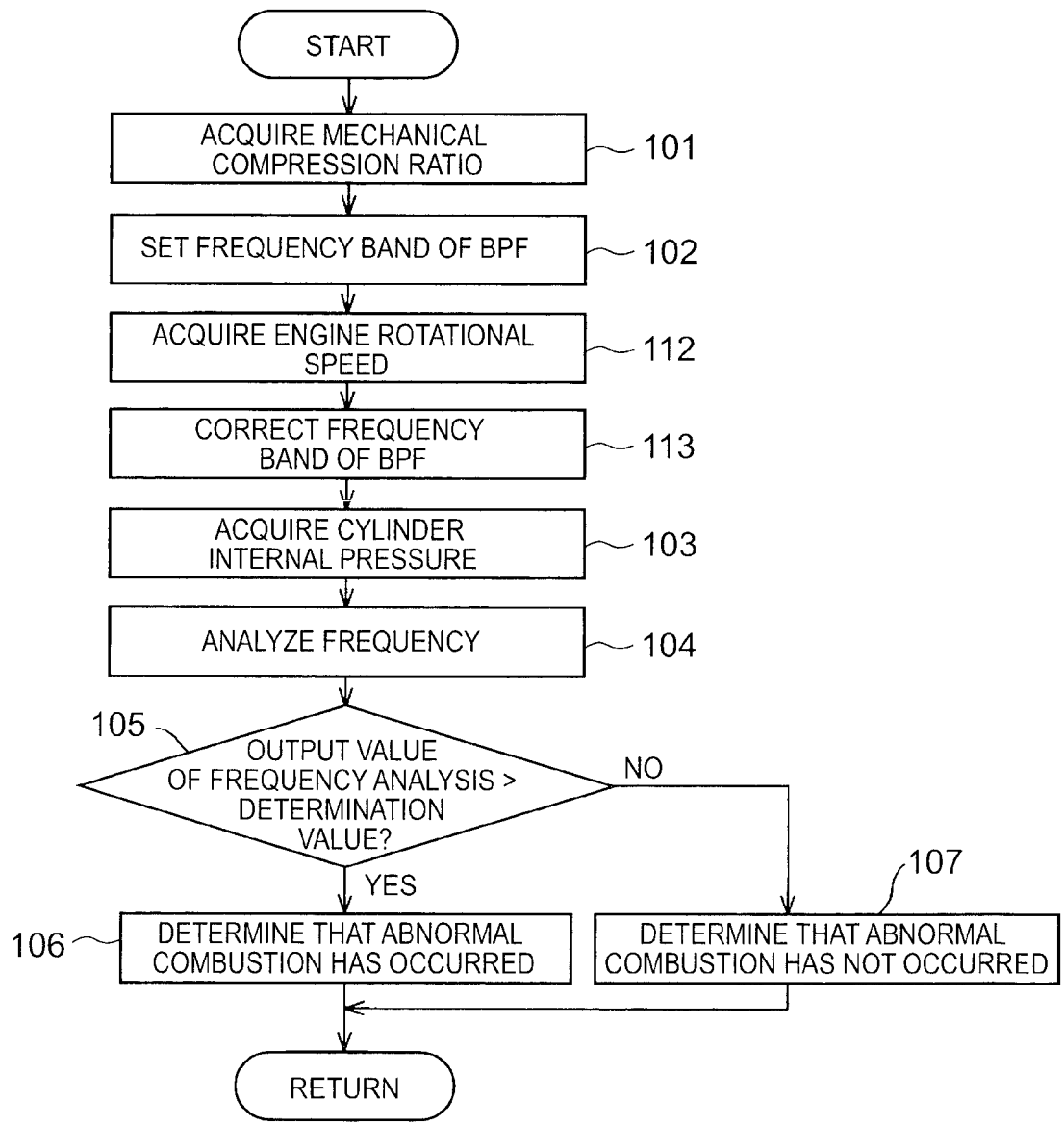
FIG. 17 is a flow chart of control for determining an occurrence of abnormal combustion according to the third embodiment.

FIG. 17 shows a flow chart of control of the internal combustion engine according to the present embodiment. Steps 101 and 102 are similar to the control according to the first embodiment (refer to FIG. 7). In step 102, the frequency band of the band pass filter when an engine rotational speed is not considered or, in other words, when a variation of the height H of the combustion chamber 5 is not considered is set.

In step 112, an engine rotational speed is acquired. Referring to FIG. 1, in the present embodiment, the crank angle sensor 42 functions as a rotational speed detector. An engine rotational speed can be detected from an output of the crank angle sensor 42.

Next, in step 113, a frequency band of the band pass filter is corrected. A correction amount of the frequency band of the band pass filter can be set based on an engine rotational speed, and the frequency band of the band pass filter can be corrected based on the set correction amount. Steps 103 to 107 are similar to the control according to the first embodiment (refer to FIG. 7). In particular, in step 104, a signal of a specific pressure vibration is extracted from the acquired pressure signal using the band pass filter with the corrected frequency band.

Even with the internal combustion engine according to the present embodiment, the frequency band of the band pass filter can be more accurately associated with the frequency of the specific pressure vibration among a pressure vibration due to abnormal combustion. As a result, noise can be reduced and detection accuracy of abnormal combustion can be improved.

Since other components, operations, and effects are similar to those of the first or second embodiment, descriptions thereof will not be repeated here.

An internal combustion engine according to a fourth embodiment of the invention will be described with reference to FIGS. 18 to 22. The internal combustion engine according to the present embodiment includes an estimator that estimates a crank angle at which abnormal combustion occurs based on a pressure signal acquired by the cylinder internal pressure sensor 61. The estimator estimates a frequency of a specific pressure vibration when abnormal combustion occurs and estimates a crank angle at which abnormal combustion occurs based on the frequency of the specific pressure vibration. The abnormal combustion detector sets a crank angle section at which abnormal combustion occurs and a frequency band of a filter based on the estimated crank angle at which abnormal combustion occurs.

Figure 18:
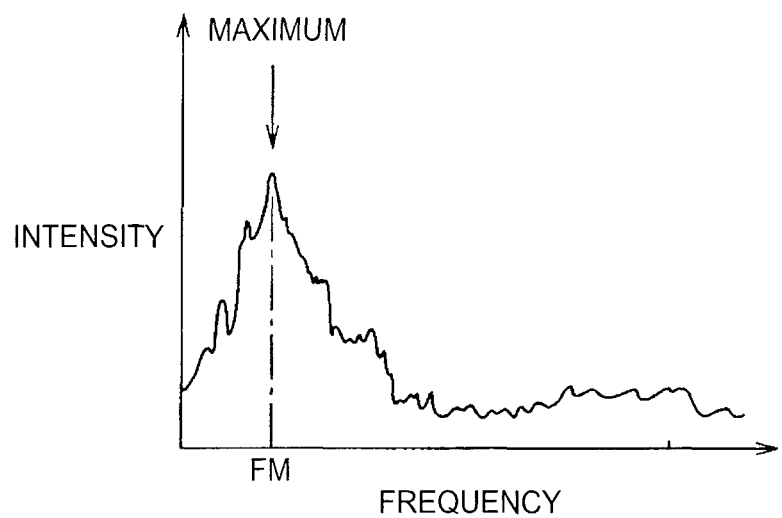
FIG. 18 is a graph explaining a relationship between a frequency of pressure vibration and an intensity of vibration according to a fourth embodiment.

FIG. 18 shows a graph representing an intensity of a vibration corresponding to the frequency of the pressure vibration detected by the cylinder internal pressure sensor 61. In the present embodiment, the electronic control unit 31 functions as an estimator. Intensity that is plotted on a vertical axis corresponds to an amplitude of a vibration. Such a graph can be calculated by subjecting a signal of the detected pressure vibration to frequency analysis. For example, by performing a transform such as a Fourier transform on the pressure of the combustion chamber 5 that is detected by the cylinder internal pressure sensor 61, an intensity of a pressure vibration corresponding to frequency can be calculated. In this example, the intensity of the pressure vibration is maximum at a frequency FM. In the present embodiment, it is estimated that a specific pressure vibration of the frequency FM has emerged.

Figure 19:
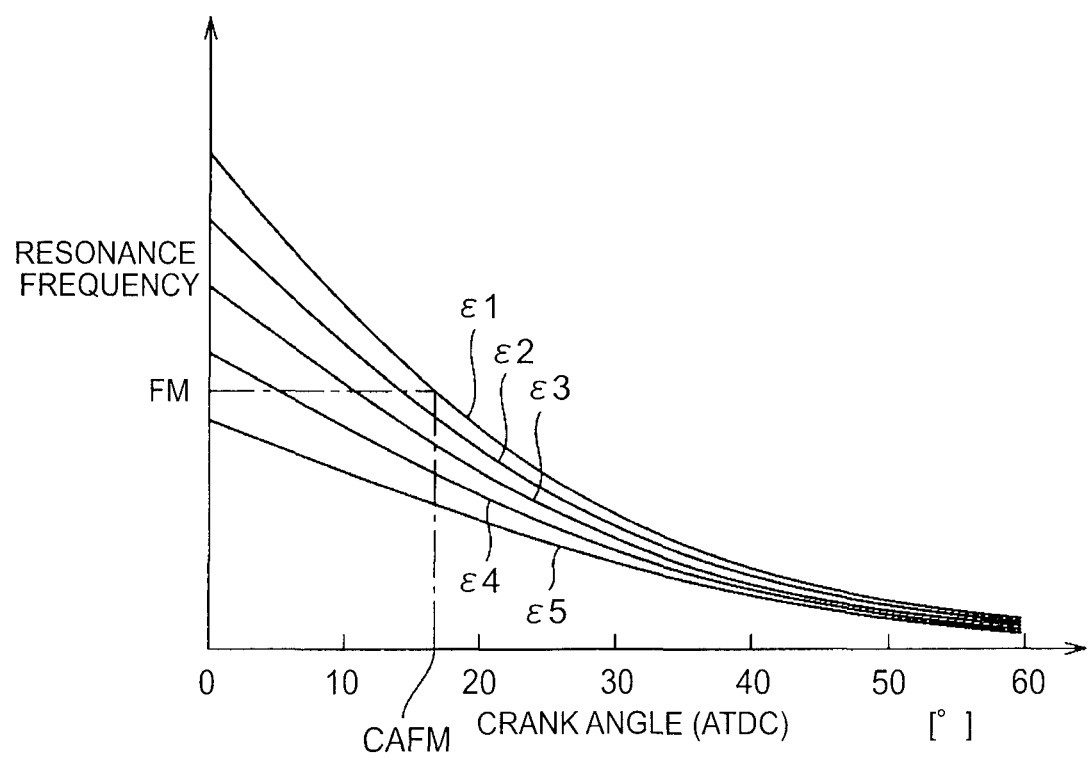
FIG. 19 is a graph explaining a crank angle at which abnormal combustion occurs according to a fourth embodiment.

FIG. 19 shows a graph of resonance frequency corresponding to crank angle. For example, when the mechanical compression ratio is the mechanical compression ratio $\epsilon 1$, a first crank angle CAFM corresponding to the frequency FM can be detected. It is shown that a pressure vibration with maximum intensity is occurring at the first crank angle CAFM. In other words, an occurrence of abnormal combustion can be estimated at the first crank angle CAFM.

The internal combustion engine according to the present embodiment includes a storage that stores a crank angle at which abnormal combustion occurs and a mechanical compression ratio. In the present embodiment, the electronic control unit 31 functions as a storage. For example, the electronic control unit 31 stores the mechanical compression ratio $\epsilon 1$ and the first crank angle CAFM at which abnormal combustion occurs. By repeating this control a plurality of times, a plurality of mechanical compression ratios and a plurality of first crank angles CAFM are stored.

Next, the electronic control unit 31 reads in the first crank angle CAFM at which abnormal combustion occurs for each mechanical compression ratio. Based on the plurality of stored first crank angles CAFM, a second crank angle CAFMM at which abnormal combustion occurs is calculated. The second crank angle CAFMM is used when setting the frequency band of the band pass filter. For the second crank angle CAFMM, for example, a most frequent crank angle can be selected from the plurality of calculated first crank angles CAFM.

As shown, the estimator estimates the second crank angle CAFMM at which abnormal combustion occurs. Next, the abnormal combustion detector sets a crank angle section SCA at which abnormal combustion occurs based on the estimated second crank angle CAFMM.

Figure 20:
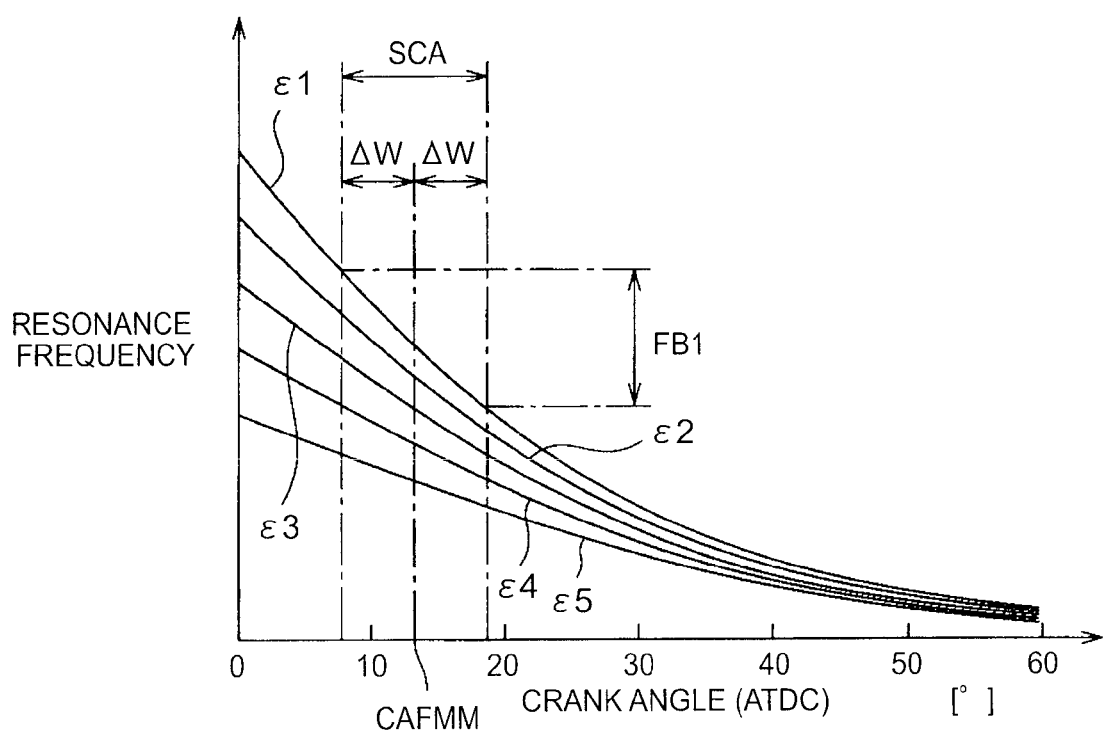
FIG. 20 is a graph explaining a section, in which abnormal combustion occurs and a frequency band of a band pass filter according to the fourth embodiment.

FIG. 20 shows a graph of resonance frequency corresponding to crank angle. The second crank angle CAFMM at which abnormal combustion occurs has been estimated by the control described earlier. In the present embodiment, the crank angle section SCA at which abnormal combustion occurs is set by adding and subtracting a crank angle width $\Delta W$ determined in advance to or from the second crank angle CAFMM. FIG. 20 illustrates a case of the mechanical compression ratio $\epsilon 1$. Any value can be adopted to the crank angle width $\Delta W$.

Next, based on the crank angle section SCA at which abnormal combustion occurs and the acquired mechanical compression ratio $\epsilon 1$, the frequency band FB1 of the band pass filter can be determined. Subsequently, a pressure signal indicating a specific pressure vibration is extracted using the frequency band FB1 of the band pass filter and a determination of abnormal combustion can be made.

Figure 21:
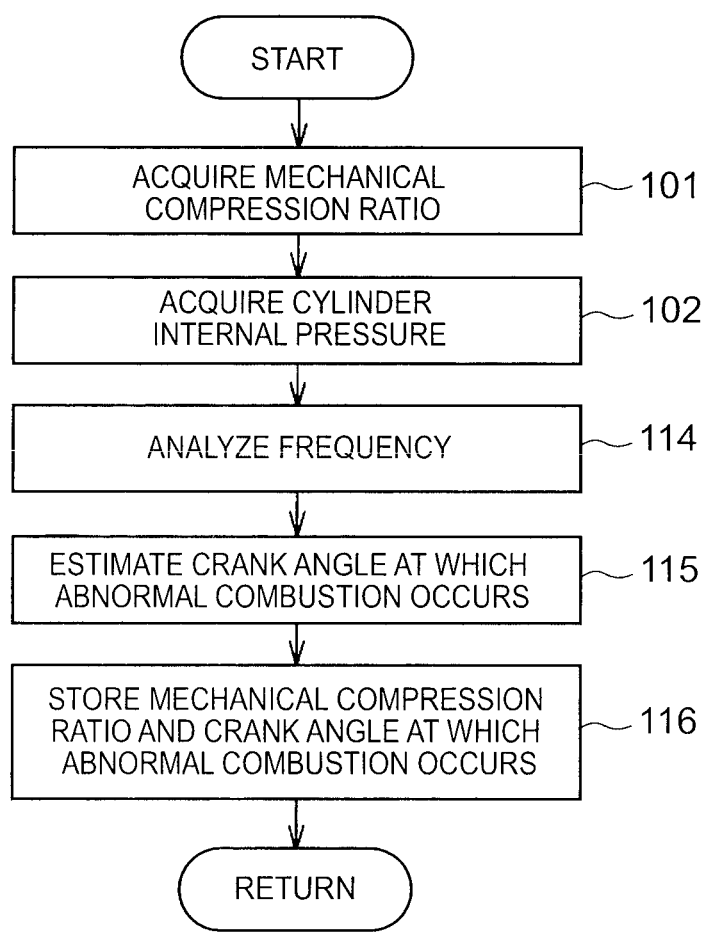
FIG. 21 is a flow chart of control for learning a crank angle at which abnormal combustion occurs according to the fourth embodiment.

FIG. 21 shows a flow chart of control for estimating a crank angle at which abnormal combustion occurs. For example, the control shown in FIG. 21 can be repetitively performed every time interval determined in advance. Steps 101 and 102 are similar to the control according to the first embodiment (refer to FIG. 7).

Next, in step 114, frequency analysis is performed. In the present embodiment, as shown in FIG. 18, intensity of a pressure vibration corresponding to a frequency is calculated and a frequency FM with maximum intensity of the pressure vibration is calculated. In other words, the frequency FM of a specific pressure vibration of abnormal combustion is calculated.

Next, in step 115, as shown in FIG. 19, based on the frequency FM and the mechanical compression ratio $\epsilon$, the first crank angle CAFM at which abnormal combustion occurs is estimated. For example, a value of the first crank angle CAFM which functionalizes the frequency FM can be stored in the electronic control unit 31 in advance for each mechanical compression ratio.

In step 116, the mechanical compression ratio c and the first crank angle CAFM at which abnormal combustion occurs are stored. In the present embodiment, the mechanical compression ratio E and the first crank angle CAFM are stored in the electronic control unit 31. By repetitively performing this control, the first crank angle CAFM at which abnormal combustion occurs can be calculated and stored in plurality for each prescribed mechanical compression ratio. In other words, a crank angle at which abnormal combustion occurs can be learned.

Figure 22:
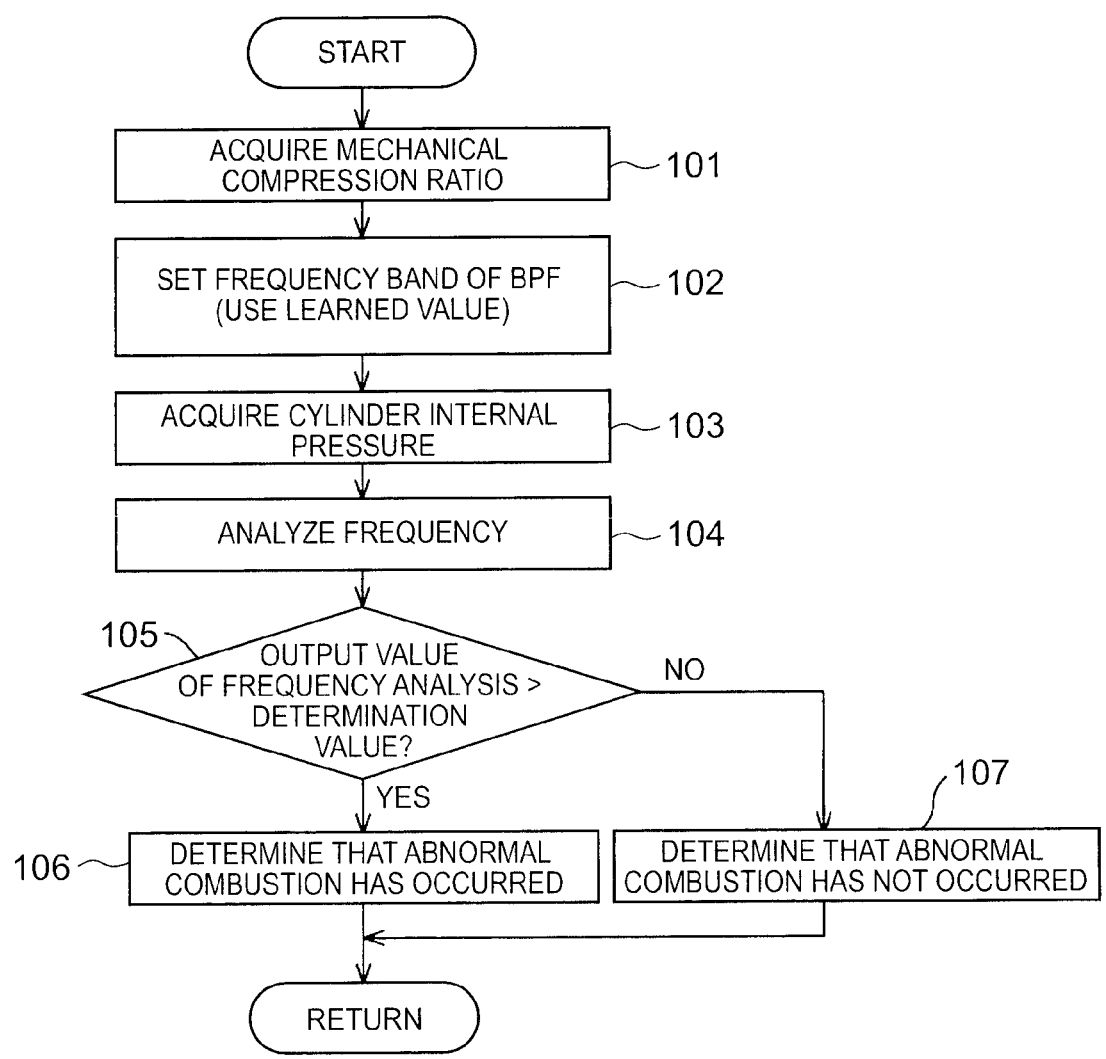
FIG. 22 is a flow chart of control for determining an occurrence of abnormal combustion according to the fourth embodiment.

FIG. 22 is a flow chart of control for determining an occurrence of abnormal combustion according to the present embodiment. In step 101, a mechanical compression ratio is acquired.

In step 102, a frequency band of the band pass filter is set. At this point, in the present embodiment, a most frequent second crank angle CAFMM is selected based on a plurality of first crank angles CAFM at which abnormal combustion occurs. The frequency band of a band pass filter is set using the second crank angle CAFMM.

Selection of the second crank angle CAFMM used in order to set the frequency band of the band pass filter is not limited to this embodiment. The second crank angle CAFMM at which abnormal combustion occurs can be set by arbitrary control using the plurality of first crank angles CAFM acquired by the control shown in FIG. 21. For example, a first crank angle CAFM at which abnormal combustion occurs that had been estimated by an immediately previous control may be adopted as the second crank angle CAFMM. Alternatively, the second crank angle CAFMM may be calculated by averaging a plurality of first crank angles CAFM.

Next, based on the second crank angle CAFMM at which abnormal combustion occurs, the crank angle section SCA at which abnormal combustion occurs is set. Referring to FIG. 20, in the present embodiment, the crank angle section SCA at which abnormal combustion occurs is set by adding and/or subtracting a crank angle width ΔW set in advance to or from the second crank angle CAFMM at which abnormal combustion occurs. Subsequently, based on a crank angle section SCA at which abnormal combustion occurs and the mechanical compression ratio $\epsilon1$, the frequency band FB1 of the band pass filter can be set.

Setting of the crank angle section SCA at which abnormal combustion occurs is not limited to this mode and the section SCA can be set by arbitrary control based on the second crank angle CAFMM. For example, the crank angle width ΔW can be statistically calculated using a plurality of first crank angles CAFM.

Referring to FIG. 22, subsequent steps 103 to 107 are similar to the control according to the first embodiment (refer to FIG. 7). In step 104, a signal of a specific pressure vibration can be extracted using the frequency band of the band pass filter set by learning in step 102.

With the internal combustion engine according to the present embodiment, since an actual crank angle at which abnormal combustion occurs is estimated, a smaller crank angle section SCA at which knocking occurs can be set. As a result, a frequency width of the frequency band of the band pass filter can be narrowed while effectively suppressing omissions in detection of a specific pressure vibration. Therefore, resistance to noise is improved and detection accuracy of abnormal combustion can be improved.

Since other components, operations, and effects are similar to those of any of the first to third embodiments, descriptions thereof will not be repeated here.

The embodiments described above can be combined with one another as appropriate. In addition, in the controls described above, sequences of steps can be changed as long as the same effects are produced.

In the respective drawings described above, same or equal portions are denoted by same reference numerals. It should be noted that the embodiments described above are exemplary and are not intended to limit the invention. In addition, it is to be understood that the embodiments include modifications described in the scope of claims.

The invention claimed is:

1. A spark ignition internal combustion engine, comprising:
   a compression ratio changing mechanism configured to change a mechanical compression ratio;
   a cylinder internal pressure acquiring unit that acquires a pressure signal indicating a pressure vibration inside a cylinder;
   a filter that passes a pressure signal having a frequency within a set frequency band among the pressure signal acquired by the cylinder internal pressure acquiring unit;
   an abnormal combustion detector that detects an occurrence of abnormal combustion based on the pressure signal having passed through the filter, wherein
   the abnormal combustion detector sets a frequency band of the filter based on a crank angle section in which abnormal combustion occurs and on the mechanical compression ratio, and when changing the frequency band of the filter in accordance with a variation of the mechanical compression ratio, the abnormal combustion detector changes a frequency width of the frequency band.

2. The spark ignition internal combustion engine according to claim 1, wherein
   the compression ratio changing mechanism changes the mechanical compression ratio by changing a volume of a combustion chamber when a piston reaches top dead center.

3. The spark ignition internal combustion engine according to claim 1, wherein
   the compression ratio changing mechanism changes the mechanical compression ratio by changing a height of the combustion chamber when a piston reaches top dead center, the pressure signal acquired by the cylinder internal pressure acquiring unit includes a pressure signal having a frequency that resonates in a height direction of the combustion chamber, and the abnormal combustion detector sets the frequency band of the filter through which the pressure signal having the frequency that resonates in the height direction of the combustion chamber passes.

4. The spark ignition internal combustion engine according to claim 1, further comprising:
   a rotational speed detector that detects an engine rotational speed, wherein
   the abnormal combustion detector sets the frequency band of the filter such that the frequency of the filter becomes lower as the engine rotational speed increases.

5. The spark ignition internal combustion engine according to claim 1, further comprising:
   an ignition timing detector that detects an ignition timing in the combustion chamber, wherein
   the abnormal combustion detector sets the frequency band of the filter based on the crank angle section, in which the abnormal combustion occurs, after the ignition timing.

6. The spark ignition internal combustion engine according to claim 1, further comprising:
   an estimator that estimates a crank angle at which the abnormal combustion occurs based on the pressure signal acquired by the cylinder internal pressure acquiring unit; and
   a storage that stores the crank angle at which the abnormal combustion occurs and the mechanical compression ratio, wherein
   the abnormal combustion detector sets the frequency band of the filter based on the crank angle at which the abnormal combustion occurs and the mechanical compression ratio that are stored in the storage.

7. The spark ignition internal combustion engine according to claim 1, wherein
   the abnormal combustion detector includes the filter.

* * * * *